(12) United States Patent
Maehira et al.

(10) Patent No.: US 11,305,551 B2
(45) Date of Patent: Apr. 19, 2022

(54) CONTROL DEVICE AND STORAGE MEDIUM

(71) Applicant: BROTHER KOGYO KABUSHIKI KAISHA, Nagoya (JP)

(72) Inventors: Hirotoshi Maehira, Nagoya (JP); Tsuyoshi Ito, Nagoya (JP); Masao Mimoto, Nagoya (JP); Yoshimitsu Taniguchi, Tajimi (JP); Shohei Ichikawa, Kasugai (JP); Kengo Noda, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/138,075

(22) Filed: Dec. 30, 2020

(65) Prior Publication Data
US 2021/0114380 A1 Apr. 22, 2021

Related U.S. Application Data

(62) Division of application No. 16/353,605, filed on Mar. 14, 2019, now Pat. No. 10,899,139.

(30) Foreign Application Priority Data

Mar. 30, 2018 (JP) .............................. JP2018-066869

(51) Int. Cl.
*B41J 2/21* (2006.01)
*B41J 11/42* (2006.01)
*G06K 15/10* (2006.01)

(52) U.S. Cl.
CPC ........... *B41J 2/2132* (2013.01); *B41J 2/2135* (2013.01); *B41J 11/42* (2013.01); *G06K 15/105* (2013.01); *B41J 2/21* (2013.01)

(58) Field of Classification Search
CPC ........ B41J 2/2132; B41J 11/42; B41J 2/2135; B41J 2/21; G06K 15/105
See application file for complete search history.

(56) References Cited

U.S. PATENT DOCUMENTS

| 5,847,721 A | 12/1998 | Ogata et al. |
| 6,788,434 B1 | 9/2004 | Kanematsu et al. |

(Continued)

FOREIGN PATENT DOCUMENTS

| JP | 5-225378 A | 9/1993 |
| JP | 8-244253 A | 9/1996 |

(Continued)

OTHER PUBLICATIONS

Notice of Reasons for Refusal issued in related Japanese patent application No. 2018-066869, dated Feb. 22, 2022.

*Primary Examiner* — Geoffrey S Mruk
(74) *Attorney, Agent, or Firm* — Merchant & Gould P.C.

(57) ABSTRACT

A control device for a printing execution unit including a printing head, a head drive unit, and a movement unit, wherein, in a case where a non-character object region is located at an upstream end of a partial region which is configured to be printed by a first partial printing: dots are formed in a first overlap region by both the first partial printing and a second partial printing, the first overlap region including the upstream end of the partial region, wherein, in a case where a character region is located at the upstream end of the partial region, dots are formed in a second overlap region by both the first partial printing and the second partial printing, the second overlap region including the upstream end of the partial region, and wherein a length of the second overlap region is shorter than a length of the first overlap region.

9 Claims, 11 Drawing Sheets

(56) References Cited

U.S. PATENT DOCUMENTS

| | | | |
|---|---|---|---|
| 2007/0120883 | A1 | 5/2007 | Tsuboi |
| 2010/0123750 | A1 | 5/2010 | Hayashi et al. |
| 2010/0182366 | A1 | 7/2010 | Takagi et al. |
| 2012/0001975 | A1 | 1/2012 | Rueby |
| 2013/0028520 | A1 | 1/2013 | Kondo et al. |
| 2016/0243862 | A1 | 8/2016 | Yoshida |
| 2017/0050432 | A1 | 2/2017 | Morikawa |
| 2017/0282590 | A1* | 10/2017 | Ozawa .................. B41J 11/008 |
| 2019/0299594 | A1 | 10/2019 | Ito et al. |

FOREIGN PATENT DOCUMENTS

| | | |
|---|---|---|
| JP | 2000-318142 A | 11/2000 |
| JP | 2001-171187 A | 6/2001 |
| JP | 2002-288589 A | 10/2002 |
| JP | 2007-152582 A | 6/2007 |
| JP | 2010-120267 A | 6/2010 |
| JP | 2010-2060338 A | 11/2010 |
| JP | 2013-030090 A | 2/2013 |
| JP | 2016-153182 A | 8/2016 |
| JP | 2017-39206 A | 2/2017 |
| JP | 2019177512 A | 10/2019 |

\* cited by examiner

PATTERN DATA

RECORDING RATE

CONTROL DEVICE AND STORAGE MEDIUM

CROSS-REFERENCE TO RELATED APPLICATIONS

This application is a Divisional of U.S. patent application Ser. No. 16/353,605, filed Mar. 14, 2019, which claims priority from Japanese Patent Application No. 2018-066869 filed on Mar. 30, 2018, the entire contents of both of which are incorporated herein by reference.

TECHNICAL FIELD

The present disclosure relates to a control device for a printing execution unit including a printing head having a plurality of nozzles and a movement unit configured to move a printing medium relative to the printing head.

BACKGROUND

Related art discloses a printing apparatus configured to cause a printing head to scan so as to perform printing in a band unit. The printing apparatus is configured to execute an overlap printing of printing dot rows in a main scanning direction by using two or three nozzles so as to suppress banding. At this time, when an edge forming pixel of a character region is included in a dot row to be printed using the three nozzles, the printing apparatus prints the dot row by using the two nozzles.

However, according to the above technology, it may not be possible to sufficiently suppress a defect that a character is to be thickened due to the printing of the character using the two or more nozzles during the overlap printing.

SUMMARY

An aspect of the present disclosure provides a technology capable of suppressing a character from being thickened in a print image.

According to an aspect of the disclosure, there is provided a control device for a printing execution unit including: a printing head including a plurality of nozzles configured to discharge ink; a head drive unit configured to cause the printing head to discharge the ink and to form dots on a printing medium; and a movement unit configured to move the printing medium relative to the printing head in a moving direction, the control device including: a controller configured to perform: acquiring target image data; specifying a character region indicative of a character in a print image based on the target image data, and a non-character object region indicative of an object different from the character in the print image; and causing the printing execution unit to print the print image by using the target image data, the print image being printed by alternately executing, for a plurality of times, (i) a partial printing in which dots are formed by the printing head and (ii) moving of the printing medium by the movement unit, and the plurality of times of the partial printings including a first partial printing and a second partial printing, wherein, in a case where a first condition including a condition that the non-character object region is located at an upstream end, in the moving direction, of a partial region which is configured to be printed by the first partial printing is met, the printing execution unit is caused to print the print image by: executing the first partial printing; moving the printing medium by a first movement amount after the first partial printing has been executed; and executing the second partial printing after the printing medium has been moved by the first movement amount, wherein dots are formed in a first overlap region by both the first partial printing and the second partial printing, the first overlap region including the upstream end of the partial region, wherein, in a case where a second condition including a condition that the character region is located at the upstream end of the partial region is met, the printing execution unit is caused to print the print image by: executing the first partial printing; moving the printing medium by a second movement amount greater than the first movement amount after the first partial printing has been executed; and executing the second partial printing after the printing medium has been moved by the second movement amount, wherein dots are formed in a second overlap region by both the first partial printing and the second partial printing, the second overlap region including the upstream end of the partial region, and wherein a length of the second overlap region in the moving direction is shorter than a length of the first overlap region in the moving direction.

According to the above configuration, in a case where the second condition including the condition that the character region is located at the upstream end of the partial region is met, the length of the second overlap region in which the dots are formed by both the first partial printing and the second partial printing becomes shorter than the length of the first overlap region. As a result, it is possible to suppress the character from being thickened. Also, in this case, since the printing medium is moved by the second movement amount greater than the first movement amount after the first partial printing has been executed, it is possible to increase the printing speed.

According to another aspect of the disclosure, there is provided a control device for a printing execution unit including: a printing head including a plurality of nozzles configured to discharge ink; a head drive unit configured to cause the printing head to discharge the ink and to form dots on a printing medium; and a movement unit configured to move the printing medium relative to the printing head in a moving direction, the control device including: a controller configured to perform: acquiring target image data; specifying a character region indicative of a character in a print image based on the target image data, and a non-character object region indicative of an object different from the character in the print image; and causing the printing execution unit to print the print image by using the target image data, the print image being printed by alternately executing, for a plurality of times, (i) a partial printing in which dots are formed by the printing head and (ii) moving of the printing medium by the movement unit, and the plurality of times of the partial printings including a first partial printing and a second partial printing, wherein, in a case where a first condition including a condition that the non-character object region is located at an upstream end, in the moving direction, of a partial region which is configured to be printed by the first partial printing is met, the printing execution unit is caused to print the print image by: executing the first partial printing; moving the printing medium by a first movement amount after the first partial printing has been executed; and executing the second partial printing after the printing medium has been moved by the first movement amount, wherein dots are formed in a first overlap region by both the first partial printing and the second partial printing, the first overlap region including the upstream end of the partial region, wherein, in a case where a second condition including a condition that the character region is located at the upstream end of the partial region is met, the printing execution unit is caused to print the print image by: executing the first partial printing; moving the printing medium by a second movement amount greater than the first movement amount after the first partial printing has been executed; and executing the second partial printing after the printing medium has been moved by the second movement amount, wherein the dots are formed in the partial region by the first partial printing and the dots are not formed in the partial region by the second partial printing.

According to the above configuration, in a case where the second condition including the condition that the character region is located at the upstream end of the partial region is met, the dots are not formed in the partial region during the second partial printing. As a result, it is possible to suppress the character from being thickened. Also, in this case, since the printing medium is moved by the second movement amount greater than the first movement amount after the first partial printing has been executed, it is possible to increase the printing speed.

In the meantime, the technology of the present disclosure can be implemented in a variety of forms, such as a printing apparatus, a control method of the printing execution unit, a printing method, a storage medium having a computer program for implementing functions of the apparatus and method recorded therein, and the like.

DETAILED DESCRIPTION

A. First Illustrative Embodiment

A-1: Configuration of Printer 200

Figure 1:
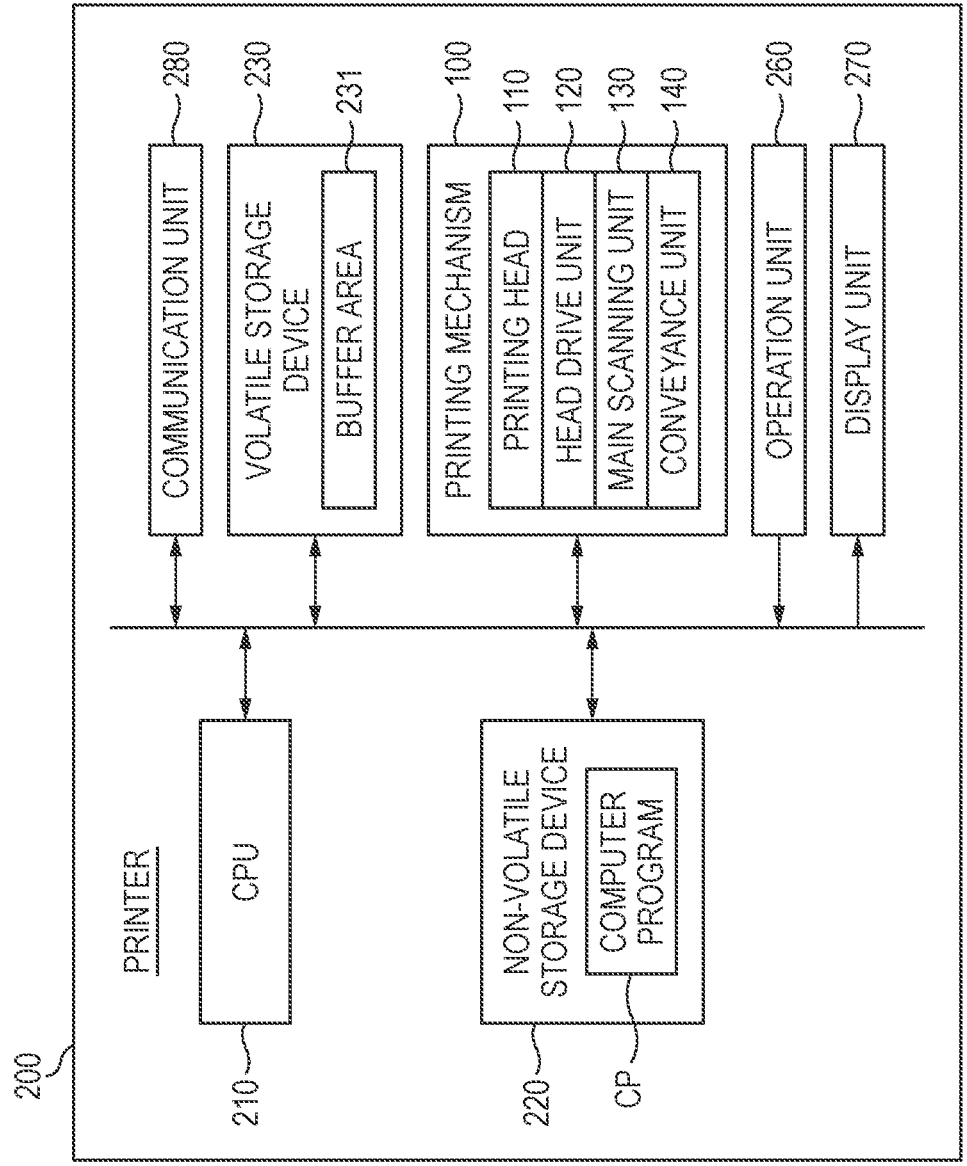
FIG. 1 is a block diagram depicting a configuration of an illustrative embodiment.

Hereinafter, an illustrative embodiment will be described. FIG. 1 is a block diagram depicting a configuration of an illustrative embodiment.

A printer 200 includes a printing mechanism 100, a CPU 210 as a control device for the printing mechanism 100, a non-volatile storage device 220 such as a hard disk drive, a volatile storage device 230 such as a hard disk and a flash memory, an operation unit 260 such as button and a touch panel for acquiring a user's operation, a display unit 270 such as a liquid crystal monitor, and a communication unit 280, for example. The printer 200 is communicatively connected to an external device, for example, a terminal device (not shown) of a user via the communication unit 280.

The volatile storage device 230 provides a buffer area 231 for temporarily storing therein a variety of intermediate data that are generated when the CPU 210 performs processing. In the non-volatile storage device 220, a computer program CP is stored. In the first illustrative embodiment, the computer program CP is a control program for controlling the printer 200, and can be provided with being stored in the non-volatile storage device 220 upon shipment of the printer 200. Also, the computer program CP is provided to be downloaded from a server. Instead of this configuration, the computer program CP may be provided with being stored in a DVD-ROM or the like. The CPU 210 is configured to execute the computer program CP, thereby controlling the printing mechanism 100 to execute printing processing (which will be described later), for example.

The printing mechanism 100 is configured to perform printing by discharging respective inks (liquid droplets) of cyan (C), magenta (M), yellow (Y) and black (K). The printing mechanism 100 includes a printing head 110, a head drive unit 120, a main scanning unit 130 and a conveyance unit 140.

Figure 2:
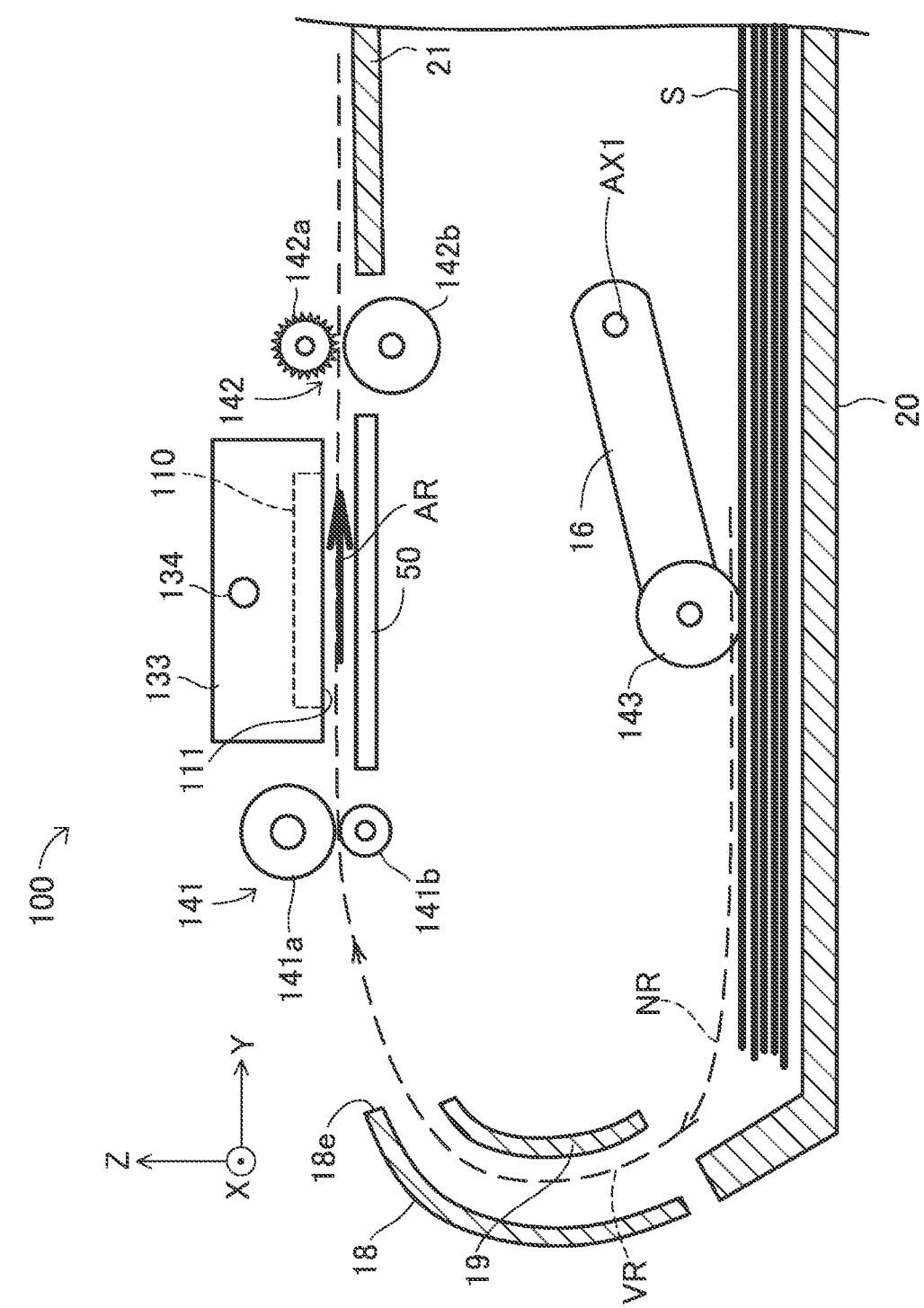
FIG. 2 depicts a schematic configuration of a printing mechanism 100.

FIG. 2 depicts a schematic configuration of the printing mechanism 100. The printing mechanism 100 further includes a sheet feeding tray 20 in which a plurality of sheets S before printing is accommodated with being overlapped, a sheet discharge tray 21 to which a printed sheet is to be discharged, and a platen 50 arranged to face a nozzle formation surface 111 of the printing head 110.

The conveyance unit 140 is configured to convey the sheet S along a conveyance path NR from the sheet feeding tray 20 to the sheet discharge tray 21 through a space between the printing head 110 and the platen 50. The conveyance path NR includes a curved path VR, which is a curved part, as seen in an X direction of FIG. 2. The curved path VR is arranged between a pickup roller 143 and a pair of upstream-side rollers 141 (which will be described later) on the conveyance path NR. The X direction is a direction perpendicular to a conveying direction AR and parallel with a printing surface of the sheet S to be conveyed. An upstream side of the conveyance path NR is simply referred to as 'upstream side', and a downstream side of the conveyance path NR is simply referred to as 'downstream side'.

The conveyance unit 140 includes an outer guide member 18 and an inner guide member 19 configured to guide the sheet S along the conveyance path NR, and a pickup roller 143, a pair of upstream-side rollers 141 and a pair of downstream-side rollers 142 provided on the conveyance path NR.

The outer guide member 18 and the inner guide member 19 are arranged on the curved path VR. The outer guide member 18 is a member configured to support the sheet S from an outer surface (printing surface) with the sheet S being curved on the curved path VR. The inner guide member 19 is a member configured to support the sheet S from an inner surface (a surface opposite to the printing surface) with the sheet S being curved on the curved path VR.

The pickup roller 143 is mounted to a leading end of an arm 16 configured to be rotatable about a shaft AX1, and is configured to hold the sheet S by sandwiching the sheet S between the pickup roller and the sheet feeding tray 20. In other words, the pickup roller 143 is provided at a more upstream side of the conveyance path NR than the pair of upstream-side rollers 141, and is configured to hold the sheet S. The pickup roller 143 is configured to separate one sheet S from the plurality of sheets S accommodated in the sheet feeding tray 20 and to deliver the same onto the conveyance path NR.

The pair of upstream-side rollers 141 includes a drive roller 141a configured to be drive by a motor (not shown) and a driven roller 141b configured to rotate in association with rotation of the drive roller 141a. Likewise, the pair of downstream-side rollers 142 includes a drive roller 142a and a driven roller 142b. The driven roller 142b of the pair of downstream-side rollers 142 is a roller having a plurality of thin plate-shaped spurs concentrically arranged. This is not to damage a print image printed on the sheet S. The drive roller 141a, the driven roller 141b and the drive roller 142a are cylindrical rollers, for example.

The pair of upstream-side rollers 141 is configured to hold the sheet S at a more upstream side than the printing head 110. The pair of downstream-side rollers 142 is configured to hold the sheet S at a more downstream side than the printing head 110. In the meantime, the conveying direction AR of FIG. 2 is a conveying direction (+Y direction) of the sheet between the printing head 110 and the platen 50.

The main scanning unit 130 includes a carriage 133 configured to mount thereto the printing head 110 and a slide shaft 134 configured to hold the carriage 133 to be reciprocally moveable in a main scanning direction (X-axis direction). The main scanning unit 130 is configured to reciprocally move the carriage 133 along the slide shaft 134 by using power of a main scanning motor (not shown). Thereby, a main scanning of reciprocally moving the printing head 110 in the main scanning direction is implemented.

Figure 3:
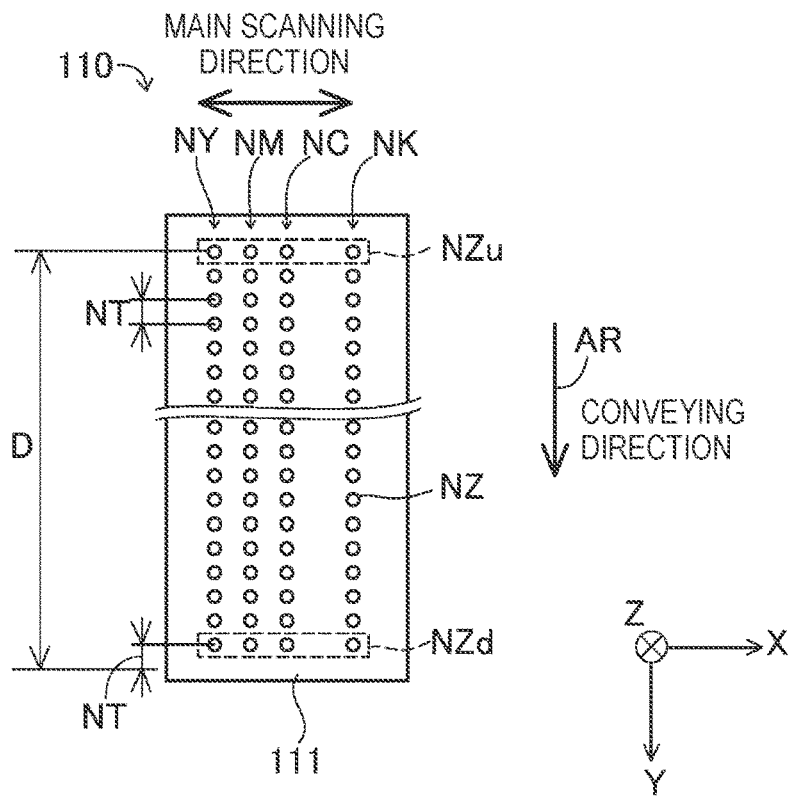
FIG. 3 depicts a configuration of a printing head 110.

FIG. 3 depicts a configuration of the printing head 110, as seen from −Z side (a lower side, in FIG. 2). As shown in FIG. 3, the nozzle formation surface 111 of the printing head 110 facing the platen 50 is formed with a plurality of nozzle rows including a plurality of nozzles, i.e., nozzle rows NC, NM, NY, NK for discharging the respective inks of C, M, Y and K. Each nozzle row includes a plurality of nozzles NZ. The plurality of nozzles NZ has positions different from each other in the conveying direction AR, and is aligned with predetermined nozzle intervals NT in the conveying direction. The nozzle interval NT is a length in the conveying direction between two nozzles NZ, which are adjacent to each other in the conveying direction AR, of the plurality of nozzles NZ. A nozzle NZ, which is located at the most upstream side (−Y side), of the nozzles configuring the nozzle row, is referred to as the most upstream nozzle NZu. Also, a nozzle NZ, which is located at the most downstream side (+Y side), of the nozzles configuring the nozzle row, is referred to as the most downstream nozzle NZd. A length obtained by adding the nozzle interval NT to a length in the conveying direction AR from the most upstream nozzle NZu to the most downstream nozzle NZd is referred to as 'nozzle length D'.

The head drive unit 120 is configured to drive the printing head 110, which is configured to reciprocally move by the main scanning unit 130, on the sheet S to be conveyed by the conveyance unit 140. That is, the printing head 110 is configured to discharge the inks from the plurality of nozzles NZ of the printing head 110, thereby forming dots on the sheet S. Thereby, an image is printed on the sheet S.

A-2. Printing Processing

Figure 4:
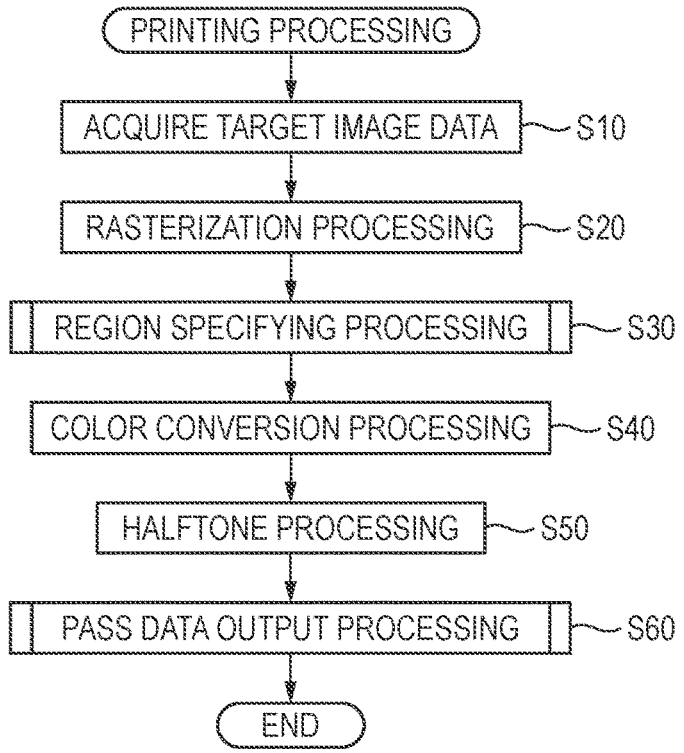
FIG. 4 is a flowchart of printing processing.

The CPU 210 (FIG. 1) of the printer 200 is configured to execute printing processing, based on a user's printing instruction. In the printing instruction, a designation of image data indicative of an image to be printed is included. FIG. 4 is a flowchart of the printing processing. In S10, the CPU 210 acquires image data designated by the printing instruction from the external device or the volatile storage device 230. The image data is image data having a variety of formats such as image data compressed in a JPEG manner or image data described by a description language, for example.

In S20, the CPU 210 executes rasterization processing for the acquired image data to generate RGB image data to express colors of respective pixels by RGB values. Thereby, RGB image data is acquired as target image data of the first illustrative embodiment. The RGB values including three component values of red (R), green (G) and blue (B), for example.

In S30, the CPU 210 executes region specifying processing for the RGB image data (target image data). The region specifying processing is processing of specifying a character region and a non-character object region in an RGB image RI to be indicated by the RGB image data. The character region is a region indicative of a character, and the non-character object region is a region indicative of an object different from the character. The object different from the character means a part, which is different from a character, of parts (parts to be drawn by dots during the printing) having colors different from a background color (generally, white) corresponding to a ground color of the sheet S. The object different from the character includes a photograph, a drawing, and a background different from white.

Figure 5:
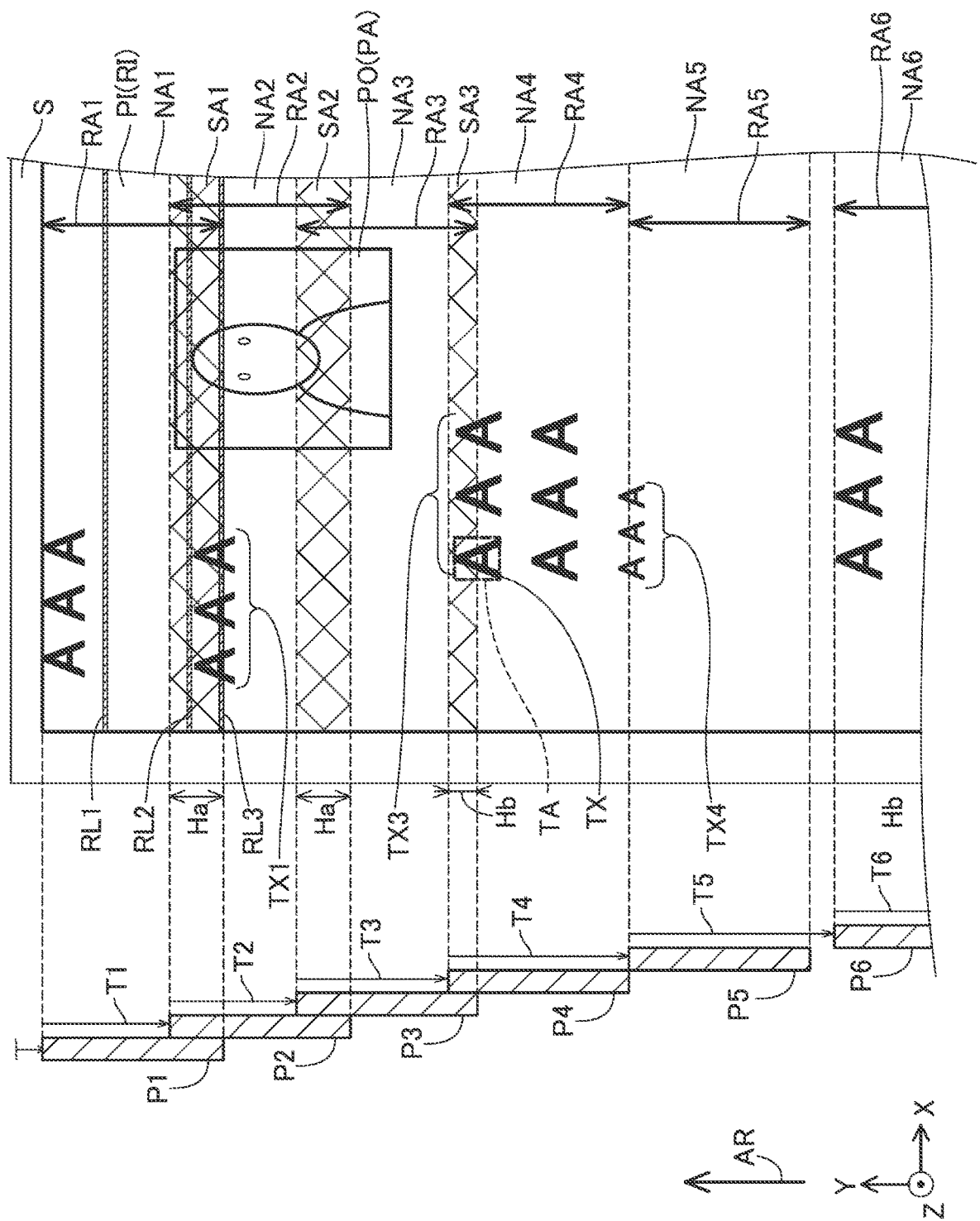
FIG. 5 depicts an example of a print image PI of a first illustrative embodiment.

FIG. 5 depicts an example of a print image PI of the first illustrative embodiment. Since the print image PI of FIG. 5 is an image printed on the basis of the RGB image data, it can be said that FIG. 5 is a figure indicative of the RGB image RI. As shown in FIG. 5, the RGB image RI includes a plurality of characters TX and a photograph PO. By the region specifying processing, a character region TA, which is a rectangular region circumscribing each of the characters TX, and a non-character object region PA, which is a rectangular region circumscribing the photograph PO, are specified. In the meantime, in FIG. 5, only the character region TA corresponding to one character is shown so as to avoid complication of the figure. However, in the processing, the character regions TA corresponding to all the characters TX in the RGB image RI are specified. In the meantime, a plurality of pixels configuring the RGB image RI and a plurality of pixels configuring the print image PI (which will be described later) correspond to each other. Therefore, the specifying of the character region TA and the non-character object region PA in the RGB image RI is equivalent to specifying a character region TA and a non-character object region PA in the print image PI. The region specifying processing will be described later.

In S40, the CPU 210 executes color conversion processing for the RGB image data to generate CMYK image data to express colors of respective pixels by CMYK values. The CMYK values are color values including component values (component values of C, M, Y, K) corresponding to color materials to be used for printing. The color conversion processing is executed by referring to a well-known look-up table, for example.

In S50, the CPU 210 executes halftone processing for the CMYK image data to generate dot data which expresses a dot formation state of each pixel for each color component of CMYK. Each pixel value of the dot data indicates the dot formation states of two gradations "there is no dot" and "there is a dot" or the dot formation states of four gradations "there is no dot", "small", "medium" and "large". The halftone processing is executed using a well-known method such as a dithering method, an error diffusion method or the like. The dot data is image data indicative of the print image PI (FIG. 5) including dots to be formed on a printing medium.

In S60, the CPU 410 executes pass data output processing by using the dot data. Specifically, the CPU 210 generates data (pass data), which corresponds to a single partial printing SP (which will be described later), of the dot data, adds a variety of control data to the pass data, and outputs the same to the printing mechanism 100. In the control data, data designating a conveyance amount of conveyance of the sheet S to be executed after the partial printing SP is included. As described in detail later, in the pass data output processing, the processing result of the region specifying processing in S30 is used.

Thereby, the CPU 210 can cause the printing mechanism 100 to print a print image. Specifically, the CPU 210 controls the head drive unit 120, the main scanning unit 130 and the conveyance unit 140 to alternately execute, a plurality of times, the partial printing SP and sheet conveyance T, repetitively, thereby performing the printing. In the single partial printing SP, while the single main scanning is performed with the sheet S being stationary on the platen 50, the inks are discharged from the nozzles NZ of the printing head 110 onto the sheet S, so that a part of an image to be printed is printed on the sheet S. The single sheet conveyance T is conveyance of moving the sheet S in the conveying direction AR by a predetermined conveyance amount. In the first illustrative embodiment, the CPU 210 causes the printing mechanism 100 to execute m (m: an integer of 3 or larger) partial printings SPm.

FIG. 5 depicts the sheet S on which the print image PI is printed. Also, in FIG. 5, a head position P, i.e., a relative position of the printing head 110 to the sheet S in the conveying direction is shown for each partial printing SP (i.e., for each main scanning). For each of the plurality of partial printings SP, a pass number k (k: an integer of 1 or larger) is added in order of execution, and the kth partial printing SP is referred to as 'partial printing SPk'. The head position P upon execution of the partial printing SPk is referred to as 'head position Pk'. The sheet conveyance T that is to be executed between the kth partial printing SPk and the (k+1)th partial printing SP(k+1) is referred to as 'kth sheet conveyance Tk'. In FIG. 5, the head positions P1 to P6 and sheet conveyances T1 to T6 corresponding to the first to sixth partial printings SP1 to SP6 are shown.

Here, in FIG. 5, the print image PI formed on the sheet S includes a plurality of 1-pass partial images NA1 to NA6 (regions not hatched in FIG. 5) and a plurality of 2-pass partial images SA1 to SA3 (regions hatched in FIG. 5).

Each of the 1-pass partial images NA1 to NA6 is formed by the single partial printing. Specifically, the 1-pass partial image NAk is formed only with the kth partial printing SPk, i.e., the partial printing SPk to be performed at the head position Pk.

The 2-pass partial images SA1 to SA3 are formed by the two partial printings. Specifically, the 2-pass partial image SAk is formed by the kth partial printing SPk and the (k+1)th partial printing SP(k+1). That is, the 2-pass partial image SAk is formed by the partial printing SPk to be performed at the head position Pk and the partial printing SP(k+1) to be performed at the head position P(k+1). A region in which the 2-pass partial image SAk is to be printed is a region in which dots are to be formed by both the two partial printings SPk and SP(k+1), and is referred to as an overlap region, too.

In the example of FIG. 5, the 2-pass partial image SA1 is arranged between the two 1-pass partial images NA1 and NA2. Likewise, the 2-pass partial images SA2 and SA3 are respectively arranged between the two 1-pass partial images NA2 and NA3 and between the two 1-pass partial images NA3 and NA4. Also, no 2-pass partial image is arranged between the two 1-pass partial images NA4 and NA5 and between the two 1-pass partial image NA5 and NA6. The region specifying processing (S30, in FIG. 4) and the pass data output processing (S60, in FIG. 4) for implementing such printing are described.

Figure 6:
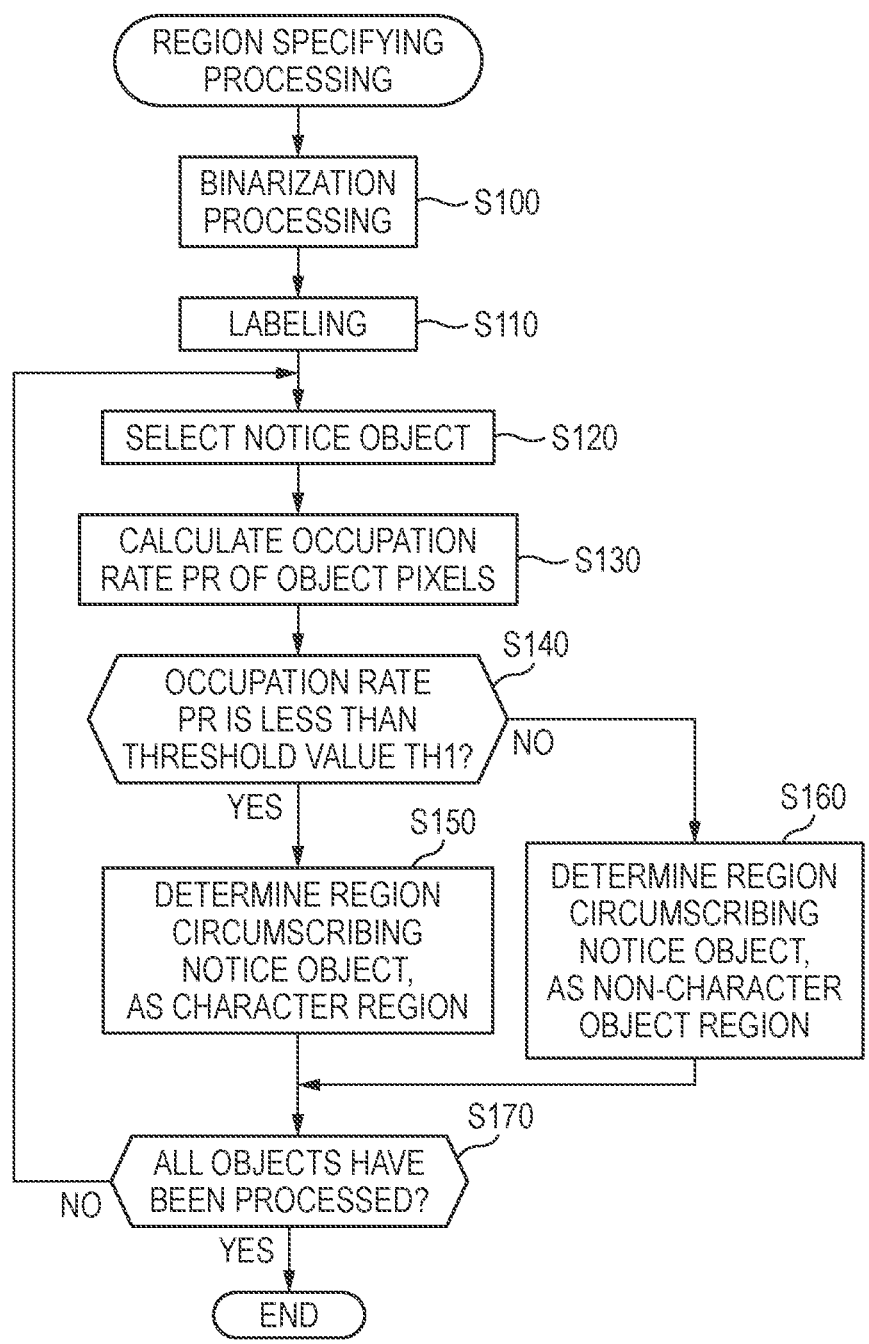
FIG. 6 is a flowchart of region specifying processing.

FIG. 6 is a flowchart of the region specifying processing. In S100, the CPU 210 executes binarization processing for the RGB image data to generate binary image data. Specifically, the plurality of pixels in the RGB image RI is classified into one of a background pixel having a background color (white, in the first illustrative embodiment) and an object pixel having a color different from the background color. In the binary image data, a pixel value corresponding to the background pixel is "0" and a pixel value corresponding to the object pixel is "1", for example. Since the binary image data generated in S100 is data indicative of a specified object pixel, it is referred to as object specifying data, too.

In S110, the CPU 210 executes labeling processing for the object specifying data to specify a plurality of objects. Specifically, the CPU 210 allots one identifier to one region including one or more continuous object pixels, as one object. Then, the CPU 210 allots different identifiers to a plurality of objects spaced from each other. By the labeling processing, the plurality of objects is specified. In the example of FIG. 5, each of the characters TX and the photograph PO are specified as objects.

In S120, the CPU 210 selects one notice object from the plurality of specified objects.

In S130, the CPU 210 calculates an occupation rate PR of the object pixels for the notice object. The occupation rate PR is a ratio of the object pixels occupying a total number of pixels in a rectangle circumscribing the notice object. For example, when the character TX of FIG. 5 is the notice object, a total number of pixels SN of a circumscribed rectangle TA shown with the broken line and a number of object pixels PN configuring the character TX are calculated. Then, a value obtained by dividing the number of object pixels PN by the total number of pixels SN is calculated as the occupation rate PR (PR=PN/SN).

In S140, the CPU 210 determines whether the occupation rate PR is less than a threshold value TH1. The threshold value TH1 is empirically determined in advance by using an image including a character or a photograph. The threshold value TH1 is for example, 40% to 60%.

In the rectangle circumscribing the character, a thin line and a background (white background, in the first illustrative embodiment) exist, and an occupation ratio of the thin line including the object pixels is lower, as compared to the non-character object such as a photograph. The non-character object, particularly, the photograph has the higher occupation rate PR, as compared to the character, for example. For example, since the photograph is generally rectangular and the substantially entirety thereof consists of the object pixels, the occupation rate PR may be 80% or higher. For this reason, when the occupation rate PR is less than the threshold value TH1 (S140: YES), the CPU 210 determines the region circumscribing the notice object, as the character region, in S150. When the occupation rate PR is equal to or higher than the threshold value TH1 (S140: NO), the CPU 210 determines the region circumscribing the notice object, as the non-character region, in S160.

In S170, the CPU 210 determines whether all the specified objects have been processed as the notice object. When there is a not-processed object (S170: NO), the CPU 210 returns to S120 and selects the not-processed object. When all the objects have been processed (S170: YES), the CPU 210 ends the region specifying processing.

Figure 7:
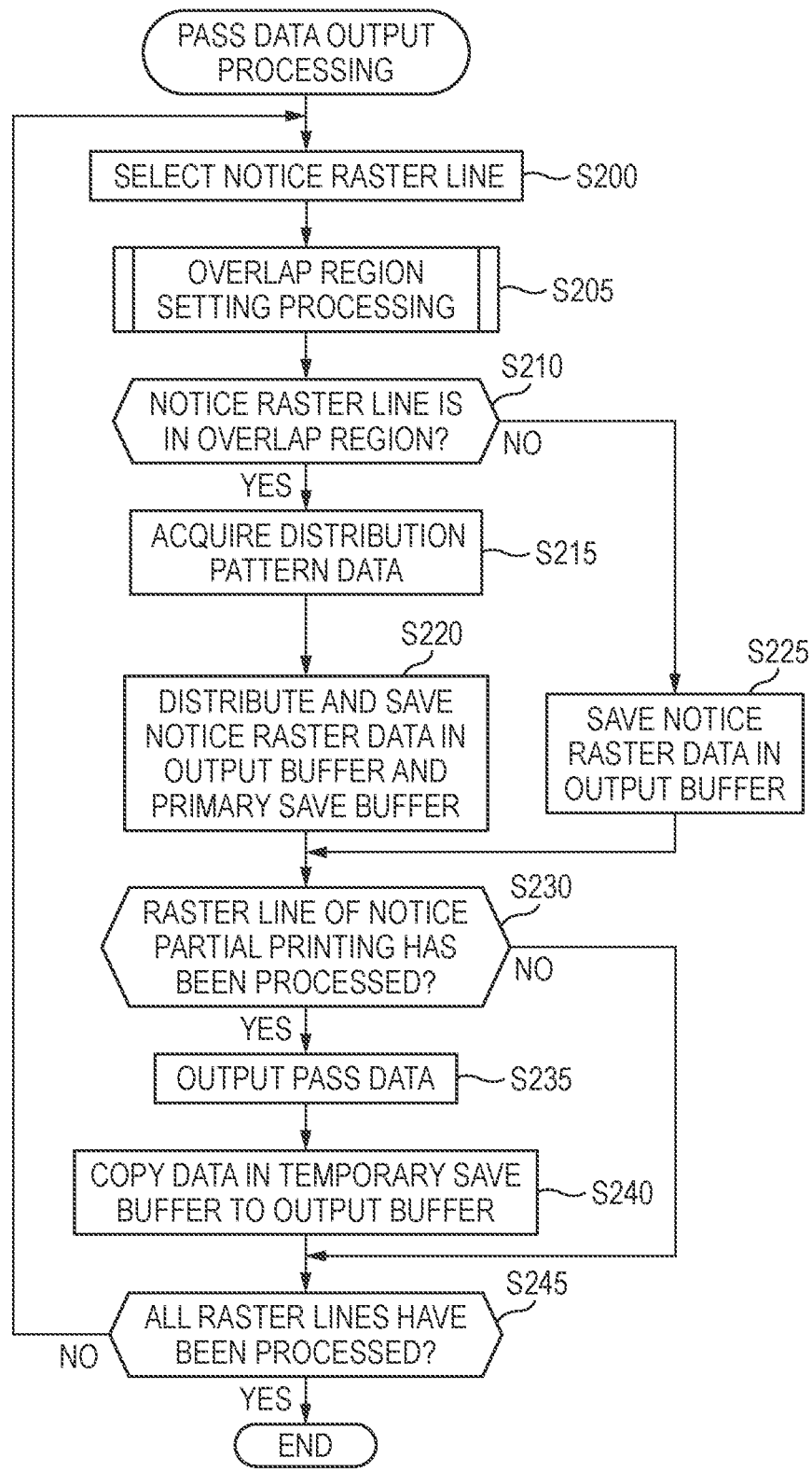
FIG. 7 is a flowchart of pass data output processing.

Subsequently, the pass data output processing in S60 of FIG. 4 is described. FIG. 7 is a flowchart of the pass data output processing. The print image PI (FIG. 5) indicated by the dot data generated in S50 includes a plurality of raster lines RL. The raster line RL is a line extending in a direction perpendicular to the conveying direction AR, like raster lines RL1 to RL3 of FIG. 5, for example, and is configured by a plurality of pixels. In S200, the CPU 210 selects one notice raster line from the plurality of raster lines RL. The notice raster line is sequentially selected one by one from the downstream side of the conveying direction AR toward the upstream side (i.e., from the upper side toward the lower side, in FIG. 5). Here, partial printing of printing the notice raster line is referred to as notice partial printing, too. However, when the notice raster line is printed by the two partial printings, i.e., when the notice raster line is located in the overlap region in which the 2-pass partial image is to be printed, the partial printing, which is to be first performed, of the two partial printings is set as the notice partial printing. For example, when the raster lines RL1 to RL3 are the notice raster lines, the notice partial printing is the partial printing SP1 to be performed at the head position P1.

In S205, the CPU 210 executes overlap region setting processing. The overlap region setting processing is processing of setting an overlap region in which a 2-pass partial image is to be formed by both the notice partial printing and the partial printing to be subsequently executed. For example, it is determined whether or not to set the overlap region. When the overlap region is to be set, a length thereof in the conveying direction (also referred to as 'overlap length') is determined. It can be said that the overlap length is a length in the conveying direction of a 2-pass partial image to be printed. For example, when the raster lines RL1 and RL2 of FIG. 5 are the notice raster lines, an overlap region having an overlap length Ha in which the 2-pass partial image SA1 is to be printed is determined to be set. In the meantime, the overlap region setting processing is executed for each of the raster lines. However, the same result is obtained for all the raster lines corresponding to the same notice partial printing.

In S210, the CPU 210 determines whether the notice raster line is located in the overlap region in which a 2-pass partial region is to be printed. Since the overlap length is determined in S205, the CPU 210 can determine whether the current notice raster line is located in the overlap region.

Figure 8A:
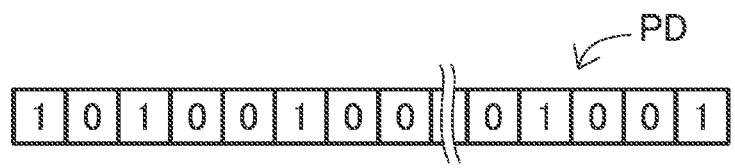
FIGS. 8A and 8B depict distribution pattern data PD and recording rates of a partial printing at head positions P2 to P4.
Figure 8B:
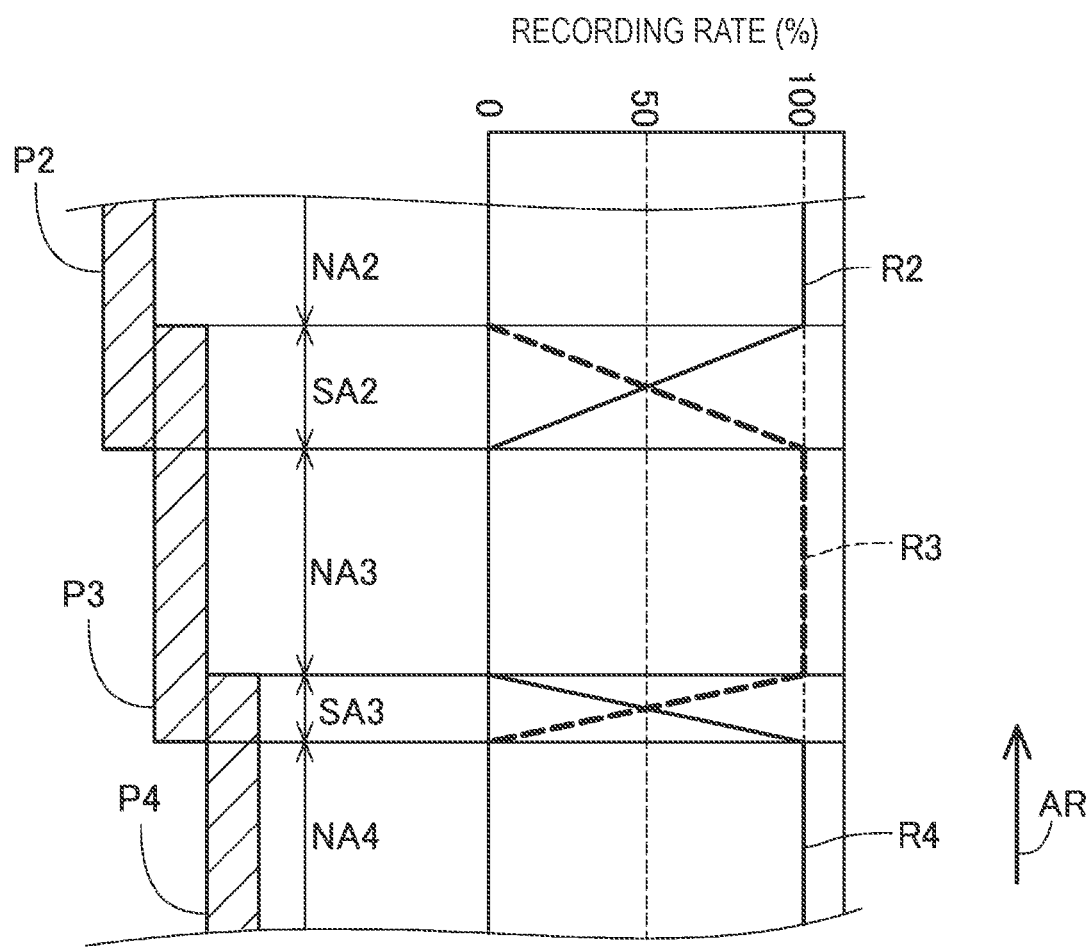

When the notice raster line is located in the overlap region (S210: YES), the CPU 210 acquires distribution pattern data PD corresponding to the notice raster line, in S215. FIGS. 8A and 8B depict the distribution pattern data PD and recording rates of the partial printing at the head positions P2 to P4. As shown in FIG. 8A, the distribution pattern data PD is binary data having values corresponding to respective pixels of the notice raster line. A value "0" of the distribution pattern data PD indicates that a dot corresponding to the pixel is to be formed by the notice partial printing. A value "1" of the distribution pattern data PD indicates that a dot corresponding to the pixel is to be formed by a subsequent partial printing of the notice partial printing.

Here, the recording rates R2, R3 and R4 of FIG. 8B are recording rates of the partial printings SP2, SP3 and SP4 to be performed at the head positions P2, P3 and P4, respectively. In FIG. 8B, the respective recording rates R2, R3 and R4 are shown with respect to positions in the conveying direction AR. In a range in the conveying direction AR corresponding to the 1-pass partial image NA2 (FIG. 5), the recording rate R2 is 100%. Likewise, in ranges in the conveying direction AR corresponding to the 1-pass partial images NA3 and NA4 (FIG. 5), the recording rates R3 and R4 are 100%.

In a range in the conveying direction AR corresponding to the 2-pass partial image SA2 (FIG. 5), the recording rate R2 linearly decreases toward the upstream side (lower side, in FIG. 8B) of the conveying direction AR. In the range in the conveying direction AR corresponding to the 2-pass partial image SA2 (FIG. 5), the recording rate R3 linearly decreases toward the downstream side (upper side, in FIG. 8B) of the conveying direction AR. In the range in the conveying direction AR corresponding to the 2-pass partial image SA2 (FIG. 5), a sum of the recording rate R2 and the recording rate R3 is 100%. The recording rates R3 and R4 in a range in the conveying direction AR corresponding to the 2-pass partial image SA3 (FIG. 5) are also the same.

In the meantime, FIG. 8B shows the recording rates only for the partial printings at the heat positions P2 to P4. However, the recording rates are also the same at the other head positions P1, P5 and P6. Thereby, the printing can be performed with the printing rate of 100% by the 1-pass partial images NA1 to NA6 and the 2-pass partial images SA1 to SA6.

The distribution pattern data PD is generated so that the above-described recording rates are to be implemented in correspondence to the positions in the conveying direction AR in the overlap region in which the 2-pass partial image is to be printed.

In S220, the CPU 210 distributes and saves data (referred to as notice raster data, too), which corresponds to the notice raster line, of the dot data in the output buffer and the primary save buffer, in accordance with the distribution pattern data PD. That is, data, which indicates dots to be formed by the notice partial printing, of the notice raster data is saved in the output buffer, and data, which indicates dots to be formed by the subsequent partial printing of the notice partial printing, is saved in the primary save buffer.

When the notice raster line is not located in the overlap region (S210: NO), the dots corresponding to the plurality of pixels included in the notice raster line should be all formed by the notice partial printing. Therefore, in this case, the CPU 210 saves the notice raster data of the dot data in the output buffer, in S225.

In S230, the CPU 210 determines whether the raster lines of the notice partial printing have been all processed as the notice raster line. For example, in the case where the partial printing SP1 performed at the head position P1 of FIG. 5 is the notice partial printing, when the raster line RL3, which is located at the most upstream side with respect to the conveying direction AR, of the plurality of raster lines RL corresponding to the head position P1 is the notice raster line, it is determined that the raster lines of the notice partial printing have been all processed.

When the raster lines of the notice partial printing have been all processed (S230: YES), the dot data of the notice partial printing has been saved in the output buffer at that point in time. Therefore, in this case, in S235, the CPU 210 outputs the dot data of the notice partial printing to the printing mechanism 100, as the pass data. At this time, the pass data to be output is added with control data indicative of a conveyance amount of the sheet conveyance that is to be performed after the notice partial printing. The conveyance amount of the sheet conveyance that is to be performed after the notice partial printing is a value that is to be determined in correspondence to the overlap length to be determined in the overlap region setting processing (which will be described later) of S205. For example, when the overlap length is determined to be Ha, the CPU 210 calculates a value obtained by subtracting the overlap length Ha from the nozzle length D, as a conveyance amount TV of the sheet conveyance T, adds control data indicative of the conveyance amount TV to the pass data, and outputs the same.

In S240, the CPU 210 deletes the output pass data from the output buffer, and copies the data saved in the primary save buffer to the output buffer. For example, at a point in time at which the final raster line RL3 corresponding to the head position P1 of FIG. 5 has been processed, the raster lines, which are located in the overlap region in which the 2-pass partial image SA1 is to be printed, of the plurality of raster lines corresponding to the head position P2 have been already processed. The data, which is used in the partial printing SP2 to be performed at the head position P2, of the raster data corresponding to the processed raster lines has been already saved in the primary save buffer. In this step, the data is copied to the output buffer.

When there is a not-processed raster line of the notice partial printing (S230: NO), the CPU 210 skips over S235 and S240.

In S245, the CPU 210 determines whether all the raster lines in the print image PI have been processed as the notice raster line. When there is a not-processed raster line (S245: NO), the CPU 210 returns to S200, and selects the not-processed raster line as the notice raster line. When all the raster lines have been processed (S245: YES), the CPU 210 ends the pass data output processing.

Figure 9:
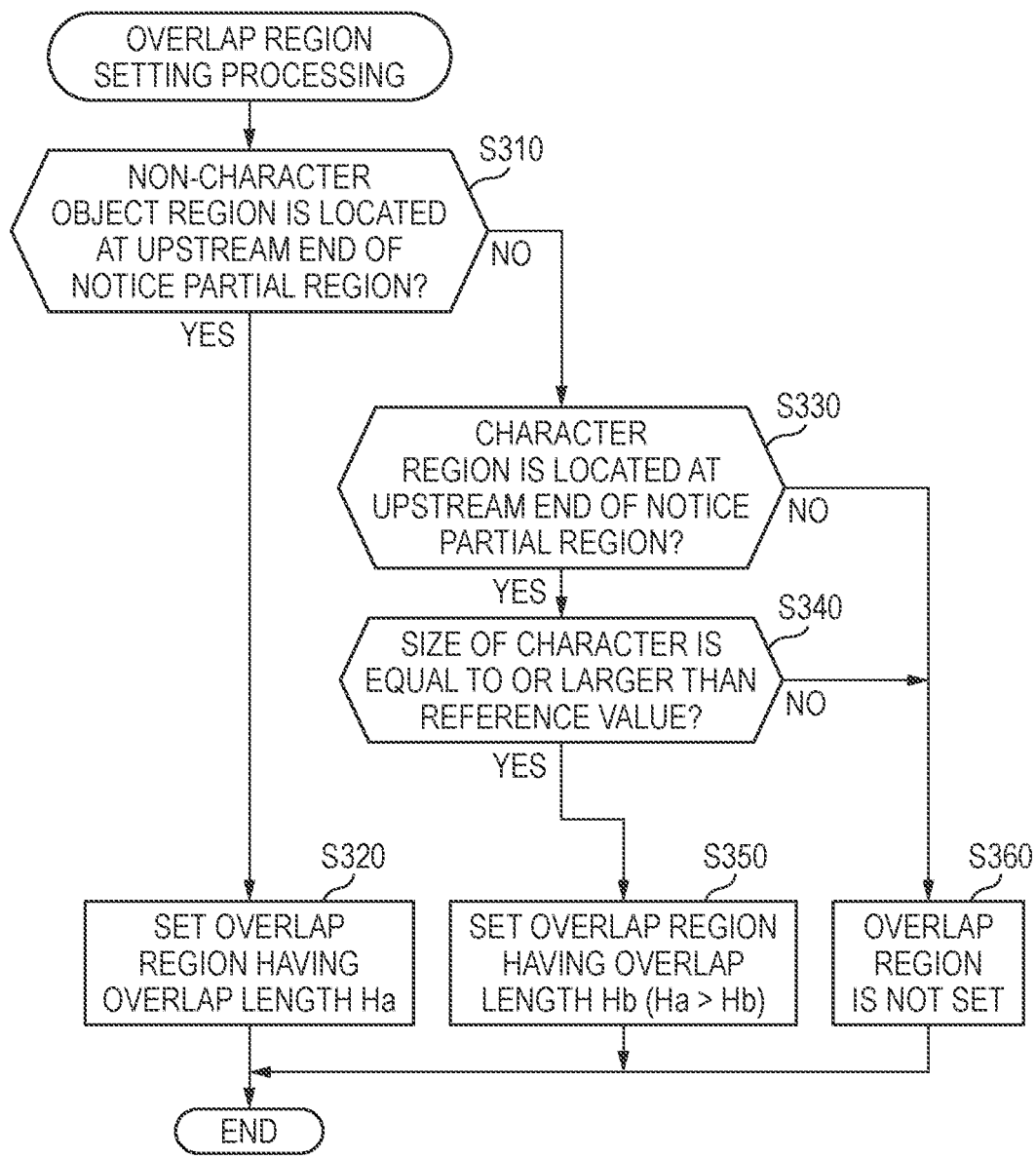
FIG. 9 is a flowchart of overlap region setting processing.

The overlap region setting processing in S205 of FIG. 7 is described. FIG. 9 is a flowchart of the overlap region setting processing. Here, a region that can be printed by the notice partial printing is referred to as 'notice partial region'. For example, when the notice partial printing is the partial printing SP1 that is performed at the head position P1, the notice partial region is a partial region RA1 of FIG. 5. When the notice partial printing is the partial printing SP2 that is performed at the head position P2, the notice partial region is a partial region RA2 of FIG. 5.

In S310, the CPU 210 determines whether the non-character object region PA is located at an upstream end (i.e., an opposite end in the conveying direction AR, a lower end in FIG. 5) of the notice partial region in the conveying direction AR. The non-character object region PA has been specified in the region specifying processing (FIG. 6). In the example of FIG. 5, the non-character object region PA is located at the upstream ends of the partial regions RA1 and RA2 that can be printed by the partial printings SP1 and SP2. The non-character object region PA is not located at the upstream ends of the partial region RA3 to RA6 that can be printed by the partial printings SP3 to SP6. Therefore, when the notice partial printing is the partial printing SP1; SP2, it is determined that the non-character object region PA is located at the upstream end of the notice partial region, and when the notice partial printing is the partial printing SP3 to SP6, it is determined that the non-character object region PA is not located at the upstream end of the notice partial region.

When the non-character object region PA is located at the upstream end of the notice partial region (S310: YES), the CPU 210 sets an overlap region having the overlap length Ha, as an overlap region in which a 2-pass partial image is to be formed by both the notice partial printing and the subsequent partial printing of the notice partial printing, in S320. The overlap region is a region including the upstream end of the notice partial region. For example, the conveyance amount TV of the sheet conveyance T that is to be performed after the notice partial printing is set as a value obtained by subtracting the length Ha from the nozzle length D (TV=D−Ha). As a result, for example, the conveyance amounts of the sheet conveyances T1 and T2 of FIG. 5 are respectively set as (D−Ha), and the lengths in the conveying direction AR of the 2-pass partial images SA1 and SA2 are respectively set as Ha.

When the non-character object region PA is not located at the upstream end of the notice partial region (S310: NO), the CPU 210 determines whether the character region TA is located at the upstream end of the notice partial region, in S330. In the example of FIG. 5, the character regions TA are located at the upstream ends of the partial regions RA3 and RA4 that can be printed by the partial printings SP3 and SP4. Therefore, when the notice partial printing is the partial printing SP3; SP4, it is determined that the character region TA is located at the upstream end of the notice partial region.

When the character region TA is located at the upstream end of the notice partial region (S330: YES), the CPU 210 determines whether a size of the character located at the upstream end of the notice partial region is equal to or larger than a reference value, in S340. Specifically, the CPU 210 calculates lengths (the number of pixels) in the conveying direction AR of one or more character regions TA (refer to FIG. 5) located at the upstream end of the notice partial region. When an average value of the lengths in the conveying direction AR of one or more character regions TA is equal to or larger than a predetermined threshold value TH2, the CPU 210 determines that the size of the character located at the upstream end of the notice partial region is equal to or larger than the reference value. When the average value of the lengths in the conveying direction AR of one or more character regions TA is smaller than the predetermined threshold value TH2, the CPU 210 determines that the size of the character located at the upstream end of the notice partial region is smaller than the reference value.

When the size of the character located at the upstream end of the notice partial region is equal to or larger than the reference value (S340: YES), the CPU 210 sets an overlap region having an overlap length Hb, as the overlap region in which the 2-pass partial image is to be printed by both the notice partial printing and the subsequent partial printing of the notice partial printing, in S350. The overlap length Hb is shorter than the overlap length Ha (Ha>Hb). For example, the conveyance length TV of the sheet conveyance T to be performed after the notice partial printing is set to a value obtained by subtracting the overlap length Hb from the nozzle length D (TV=D−Hb). As a result, for example, the conveyance amount of the sheet conveyance T3 of FIG. 5 is set to (D−Hb), and the length in the conveying direction AR of the 2-pass partial image SA3 is set to Hb.

When the character region TA is not located at the upstream end of the notice partial region (S330: NO), the CPU 210 does not set an overlap region, in S360. In this case, neither the non-character region PA nor the character region TA is located at the upstream end of the notice partial region. Therefore, the conveyance amount TV of the sheet conveyance T to be performed after the notice partial printing is set to a value greater than the nozzle length D so that the downstream end (upper end in FIG. 5) of the head position of the subsequent partial printing in the conveying direction AR is to be located at a downstream end of an object to be subsequently printed (TV>D). For example, the conveyance amount of the sheet conveyance T5 in FIG. 5 is set to a value greater than the nozzle length D, and the downstream end of the head position P6 of the subsequent partial printing SP6 is located at a downstream end of a character to be subsequently printed.

When the size of the character located at the upstream end of the notice partial region is smaller than the reference value (S340: NO), the CPU 210 does not set an overlap region, in S360. In this case, a relatively small character is located at the upstream end of the notice partial region. Therefore, the conveyance amount TV of the sheet conveyance T to be performed after the notice partial printing is set to the nozzle length D (TV=D). For example, the conveyance amount of the sheet conveyance T4 in FIG. 5 is set to the nozzle length D, and the downstream end of the head position P5 of the subsequent partial printing SP5 coincides with the upstream end of the head position P4 of the previous partial printing SP4.

The print image PI that is printed on the sheet S in accordance with the first illustrative embodiment is further described with reference to FIG. 5.

In the print image PI, the non-character object region PA is located at the upstream end of the partial region RA1 that is to be printed by the partial printing SP1. For this reason, a 2-pass partial image SA1 having a length Ha is printed between the 1-pass partial image NA1 to be printed only by the partial printing SP1 and the 1-pass partial image NA2 to be printed only by the partial printing SP2.

Likewise, the non-character object region PA is located at the upstream end of the partial region RA2 that is to be printed by the partial printing SP2. For this reason, a 2-pass partial image SA2 having a length Ha is printed between the 1-pass partial image NA2 to be printed only by the partial printing SP2 and the 1-pass partial image NA3 to be printed only by the partial printing SP3. Meanwhile, in the example of FIG. 5, a character region including the characters TX1 is located at the upstream end of the partial region RA1, and a character region is not located at the upstream end of the partial region RA2. In this way, it is determined whether the 2-pass partial image SA1 having the length Ha is to be printed, irrespective of whether or not the character region.

The non-character object region PA is not located at the upstream end of the partial region RA3 that is to be printed by the partial printing SP3, and a character region TA including relatively large characters TX3 is located. For this reason, a 2-pass partial image SA3 having a length Hb shorter than the length Ha is printed between the 1-pass partial image NA3 to be printed only by the partial printing SP3 and the 1-pass partial image NA4 to be printed only by the partial printing SP4.

The non-character object region PA is not located at the upstream end of the partial region RA4 that is to be printed by the partial printing SP4, and a character region TA including relatively small characters TX4 is located. For this reason, a 2-pass partial image is not printed between the 1-pass partial image NA4 to be printed only by the partial printing SP4 and the 1-pass partial image NA5 to be printed only by the partial printing SP5.

Neither the non-character object region PA nor the character region TA is located at the upstream end of the partial region RA5 that is to be printed by the partial printing SP5. For this reason, a 2-pass partial image is not printed between the 1-pass partial image NA5 to be printed only by the partial printing SP5 and the 1-pass partial image NA6 to be printed only by the partial printing SP6.

According to the first illustrative embodiment as described above, when the non-character object region PA is located at the upstream end of the notice partial region (for example, the partial region RA1) (YES in S310 of FIG. 9), the CPU 210 sets the conveyance amount of the sheet conveyance T, which is to be executed between the notice-part printing (for example, the partial printing SP1) and the subsequent partial printing (for example, the partial printing SP2), to a first conveyance amount ((D−Ha), in the first illustrative embodiment). Then, the CPU 210 sets a region (for example, a region in which the 2-pass partial image SA1 is to be printed) including the upstream end of the notice partial region, as the overlap region (S320 in FIG. 9). Therefore, in the example of FIG. 5, the printing mechanism 100 executes the partial printing SP1, conveys the sheet S by the conveyance amount (D−Ha) after the partial printing SP1, and executes the partial printing SP2 after the conveyance of the sheet S by the conveyance amount (D−Ha), under control of the CPU 210.

Also, when the non-character object region PA is not located at the upstream end of the notice partial region (for example, the partial region RA4) (NO in S310 of FIG. 9) and the character region TA is located (YES in S330 of FIG. 8), the CPU 210 sets the conveyance amount of the sheet conveyance T, which is to be executed between the notice-part printing (for example, the partial printing SP4) and the subsequent partial printing (for example, the partial printing SP5), to a second conveyance amount (D, in the first illustrative embodiment) greater than the first conveyance amount. In this case, the CPU 210 does not set an overlap region (S360 in FIG. 9). Therefore, in the example of FIG. 5, the printing mechanism 100 executes the partial printing SP4, conveys the sheet S by the conveyance amount D after the partial printing SP4, and executes the partial printing SP5 after the conveyance of the sheet S by the conveyance amount D, under control of the CPU 210.

As a result, when the non-character object region PA is not located at the upstream end of the partial region RA4 and the character region TA including the characters TX4 is located, the region including the upstream end of the partial region RA4 is not set as the overlap region. That is, the dots of the region including the upper end of the partial region RA4 are formed only by the partial printing SP4 and are not formed by the partial printing SP5. Therefore, it is possible to suppress the character TX4 from being thickened. Also, in this case, since the sheet S is conveyed by the conveyance amount D greater than the conveyance amount (D−Ha) after the partial printing SP4, it is possible to increase the printing speed. Also, when the non-character object region PA is located at the upstream end of the partial region RA1, the region including the upper end of the partial region RA1 is set as the overlap region. Therefore, it is possible to suppress the banding from being noticeable in the print image PI.

More specifically, it is assumed that the print image is configured only by the 1-pass partial images. In this case, due to a deviation of the conveyance amount of the sheet S, a white stripe or a black stripe may occur at a boundary of the two 1-pass partial images adjacent to each other in the conveying direction AR. That is, a defect referred to as banding may be caused. The banding is difficult to be noticeable even when it appears on the thin line configuring the character, and is easily-noticeable when it appears in a relatively wide region such as a photograph. Also, in general, when the deviation of the conveyance amount of the sheet S occurs, the conveyance unit 190 is adjusted so that the two 1-pass partial images adjacent to each other in the conveying direction AR are to be superimposed. Thereby, the white stripe is suppressed and the black stripe is permitted. Since the black stripe is a phenomenon that a density of a stripe-shaped part increases, the black stripe is difficult to be noticeable even when it is generated in an image having a relatively high density, and is easily-noticeable when it is generated in an image having a relatively low density. Here, in general, a character has a color having a high density, in many cases, and a photograph may include a color having a low density. Like this, the banding is more difficult to be noticeable in the character than in the non-character object such as a photograph.

Here, when a 2-pass partial image is provided between the two 1-pass partial images, it is possible to suppress the defect referred to as banding. That is, in the case of the 2-pass partial image, since the dots on one raster line are formed by the two partial printings, it is possible to suppress all the dots on one raster line from deviating in the same manner with respect to all the dots on the other raster lines. Meanwhile, in the case of the 2-pass partial image, the thin line is likely to be thickened. The reason is that the dots formed by one partial printing of the 2-pass partial image may deviate with respect to the dots formed by the other partial printing in the main scanning direction or the conveying direction. For this reason, in the case of the 2-pass partial image, a defect that a character configured by the thin line is thickened is likely to occur. In the meantime, in the case of the non-character object such as a photograph, the defect is difficult to occur even though it is the 2-pass partial image.

Also, when the 2-pass partial image is provided, the printing speed decreases, as compared to a case where the 2-pass partial image is not provided, because the conveyance amount (for example, D−Ha) of one sheet conveyance T is decreased, as compared to the conveyance amount (for example, D) when the 2-pass partial image is not provided, as described above.

In the first illustrative embodiment, as shown in FIG. 5, at the part at which the non-character object region PA is located, the 2-pass partial images SA1 and SA2 are respectively provided between the two 1-pass partial images NA1 and NA2 and between the two 1-pass partial images NA2 and NA3. Therefore, it is possible to suppress the banding from being caused in the non-character object region PA in which the banding is easily-noticeable. Also, at the part at which the relatively small character TX4 of which the character thickness is easily-noticeable, the 2-pass partial image is not provided between the two 1-pass partial images NA4 and NA5. Therefore, it is possible to appropriately suppress the thickness of the character. Also, it is possible to increase the printing speed, as compared to a configuration where the 2-pass partial image is always provided.

Also, in the first illustrative embodiment, when the non-character object region PA is not located at the upstream end of the notice partial region (for example, the partial region RA3) (NO in S310 of FIG. 9) and the character region including the character TX3 having a size equal to or larger than the reference value is located (YES in S340 of FIG. 9), the conveyance amount OF the sheet conveyance T, which is to be executed between the notice-part printing (for example, the partial printing SP3) and the subsequent partial printing (for example, the partial printing SP4), is set to a third conveyance amount (for example, D−Hb) greater than the first conveyance amount and less than the second conveyance amount. In this case, the region (for example, the region in which the 2-pass partial image SA3 is printed) including the upstream end of the notice partial region is set as the overlap region (S350 in FIG. 9). In this case, an overlap length of the overlap region (i.e., a length of the 2-pass partial image SA3) Hb is shorter than the overlap length Ha of the overlap region in which the 2-pass partial image SA1 is printed. Therefore, the printing mechanism 100 executes the partial printing SP3, conveys the sheet S by the conveyance amount (D−Hb) after the partial printing SP3, and executes the partial printing SP4 after the conveyance of the sheet S by the conveyance amount (D−Hb), under control of the CPU 210. In the case of the character having the size equal to or larger than the reference value, the banding is easily-noticeable and the thickness of the line is difficult to be noticeable, as compared to a character having a size smaller than the reference value. The reason is that the larger the size of the character is, the line configuring the character becomes thicker. According to the first illustrative embodiment, as compared to a case where the overlap region having the overlap length Ha is set, it is possible to suppress the character having the size equal to or larger than the reference value from being thickened. Also, as compared to a case where the overlap region is not set, it is possible to suppress the banding from being generated at the character having the size equal to or larger than the reference value. Therefore, while it is possible to suppress the banding from being generated at the character having the size equal to or larger than the reference value at which the banding is easily-noticeable, it is possible to suppress the thickness of the character.

Also, in the first illustrative embodiment, in the region specifying processing (FIG. 6), when the ratio (occupation rate PR) of the object pixels occupying the region (the region of the circumscribed rectangle of the notice object) of the determination target of the RGB image RI is less than the threshold value TH (YES in S140 of FIG. 6), the CPU 210 specifies the region of the determination target, as the character region (S150 in FIG. 6). As a result, it is possible to appropriately specify the character region TA in the RGB image RI, and further, in the print image PI.

As can be seen from the above descriptions, the conveying direction AR of the first illustrative embodiment is an example of the moving direction, the conveyance amount (D−Ha) is an example of the first movement amount, the conveyance amount D is an example of the second movement amount, and the conveyance amount (D−Hb) is an example of the third movement amount.

B. Second Illustrative Embodiment

Figure 10:
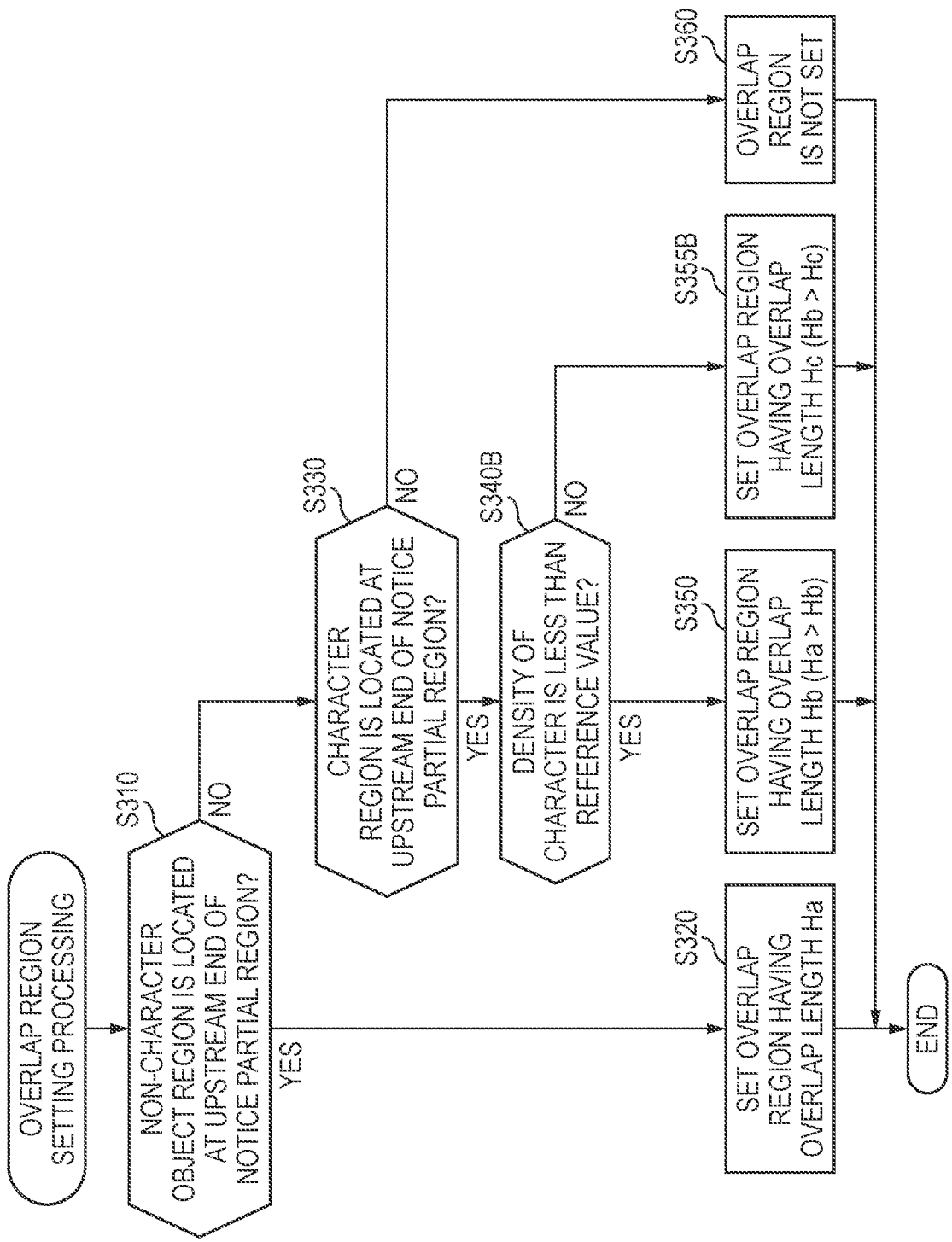
FIG. 10 is a flowchart of overlap region setting processing of a second illustrative embodiment.
Figure 11:
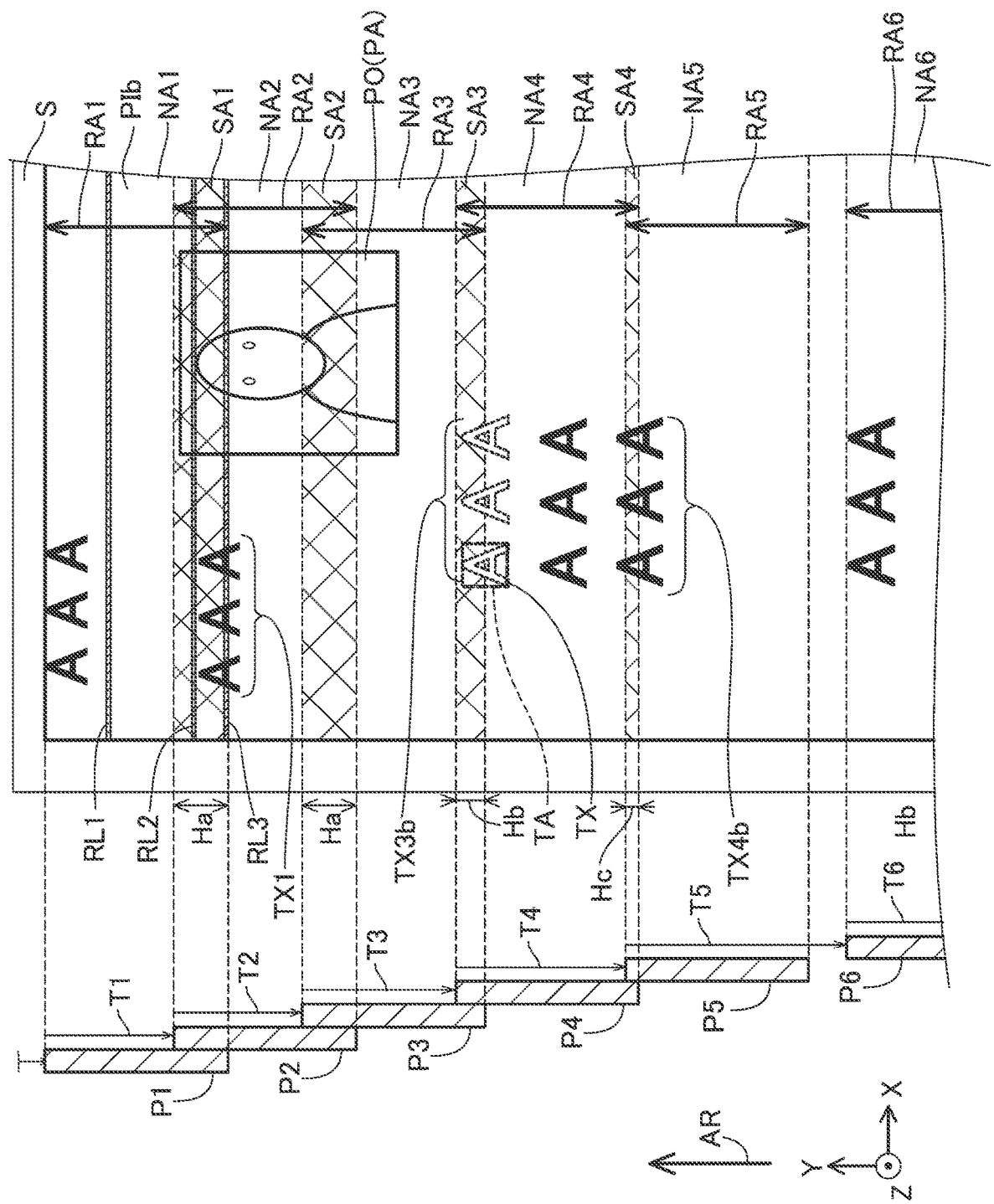
FIG. 11 depicts an example of a print image PIb of the second illustrative embodiment.

In a second illustrative embodiment, the content of the overlap region setting processing in S205 of FIG. 7 is different from the first illustrative embodiment. The other processing of the second illustrative embodiment is the same as the first illustrative embodiment. FIG. 10 is a flowchart of the overlap region setting processing of the second illustrative embodiment. In the overlap region setting processing of FIG. 10, processing of S340B is executed instead of the processing of S340 of FIG. 9, and processing of S355B is added. In FIG. 10, the same processing as FIG. 9 is denoted with the same reference numerals as FIG. 9. FIG. 11 depicts an example of a print image PIb of the second illustrative embodiment. The print image PIb of the second illustrative embodiment includes characters TX3*b* of a color having a relatively low density, instead of the characters TX3 of the print image PI in FIG. 5. Also, the print image PIb includes characters TX4*b* having a size larger than the characters TX4 and a density higher than the character TX3*b*, instead of the characters TX4 of the print image PI in FIG. 5.

In S300 of FIG. 10, when the character region TA is not located at the upstream end of the notice partial region (S330: NO), the CPU 210 does not set an overlap region, in S360. When the character region TA is located at the upstream end of the notice partial region (S330: YES), the CPU 210 determines whether a density of the character located at the upstream end of the notice partial region is less than a reference value, in S340B. Specifically, the CPU 210 specifies a plurality of object pixels, which correspond to one or more characters located at the upstream end of the notice partial region, in the object specifying data, and acquires RGB values of the plurality of object pixels from the RGB image data. The CPU 210 calculates densities of the plurality of object pixels by using the RGB values of the plurality of object pixels, respectively, and calculates an average density of the plurality of object pixels. When the average density is lower than a predetermined threshold value TH3, the CPU 210 determines that the density of the character located at the upstream end of the notice partial region is less than the reference value, and when the average density is equal to or higher than the predetermined threshold value TH3, the CPU 210 determines that the density of the character located at the upstream end of the notice partial region is equal to or higher than the reference value. For example, in the example of FIG. 11, the density of the character TX3$b$ is determined to be less than the reference value, and the density of the character TX4$b$ is determined to be equal to or higher than the reference value.

When the density of the character located at the upstream end of the notice partial region is less than the reference value (S340B: YES), the CPU 210 sets an overlap region having an overlap length Hb, as the overlap region in which a 2-pass partial image is to be printed by both the notice partial printing and the subsequent partial printing of the notice partial printing, in S350, like the case of FIG. 9. The overlap length Hb is shorter than the overlap length Ha (Ha>Hb). For example, the conveyance amount TV of the sheet conveyance T to be printed after the notice partial printing is set to a value obtained by subtracting the overlap length Hb from the nozzle length D (TV=D−Hb). As a result, for example, the conveyance amount of the sheet conveyance T3 of FIG. 5 is set to (D−Hb), and the length in the conveying direction AR of the 2-pass partial image SA3 is set to Hb.

When the density of the character located at the upstream end of the notice partial region is equal to or higher than the reference value (S340B: NO), the CPU 210 sets an overlap region having an overlap length Hc, as the overlap region in which a 2-pass partial image is to be printed by both the notice partial printing and the subsequent partial printing of the notice partial printing, in S355B. The overlap length Hc is shorter than the overlap lengths Ha and Hb (Ha>Hb>Hc). For example, the conveyance amount TV of the sheet conveyance T to be printed after the notice partial printing is set to a value obtained by subtracting the overlap length Hc from the nozzle length D (TV=D−Hc). As a result, for example, the conveyance amount of the sheet conveyance T4$b$ of FIG. 11 is set to (D−Hc). In the second illustrative embodiment, a 2-pass partial image SA4 having a length Hc in the conveying direction AR is printed between the 1-pass partial image NA4 and the 1-pass partial image NA5

According to the second illustrative embodiment as described above, like the first illustrative embodiment, when the non-character object region PA is located at the upstream end of the notice partial region (for example, the partial region RA1) (YES in S310 of FIG. 10), the conveyance amount of the sheet conveyance T, which is to be executed between the notice-part printing (for example, the partial printing SP1) and the subsequent partial printing (for example, the partial printing SP2), is set to the first conveyance amount ((D−Ha), in the second illustrative embodiment). In this case, the region (for example, the region in which the 2-pass partial image SA1 is printed) including the upstream end of the notice partial region is set as the overlap region (S320 in FIG. 10). In the second illustrative embodiment, when the non-character object region PA is not located at the upstream end of the notice partial region (for example, the partial region RA4) (NO in S310 of FIG. 10) and the character region TA including the character having the density equal to or higher than the reference value is located (YES in S330 and YES in S340 of FIG. 10), the conveyance amount of the sheet conveyance T, which is to be executed between the notice-part printing (for example, the partial printing SP4) and the subsequent partial printing (for example, the partial printing SP5), is set to the second conveyance amount ((D−Hc), in the second illustrative embodiment) greater than the first conveyance amount. Also, the region (for example, the region in which the 2-pass partial image SA4 is printed, in FIG. 11) including the upstream end of the notice partial region is set as the overlap region (S355B in FIG. 10).

Therefore, in the example of FIG. 11, the printing mechanism 100 executes the partial printing SP1, conveys the sheet S by the conveyance amount (D−Ha) after the partial printing SP1, and executes the partial printing SP2 after the conveyance of the sheet S by the conveyance amount (D−Ha), under control of the CPU 210. Also, the printing mechanism 100 executes the partial printing SP4, conveys the sheet S by the conveyance amount (D−Hc) after the partial printing SP4, and executes the partial printing SP5 after the conveyance of the sheet S by the conveyance amount (D−Hc). The overlap length Hc of the overlap region, which is set when the character region TA is located at the upstream end of the notice partial region, is shorter than overlap length Ha of the overlap region, which is set when the non-character object region PA is located at the upstream end of the notice partial region. As a result, it is possible to suppress the character TX4$b$ from being thickened. Also, in this case, since the sheet S is conveyed by the conveyance amount (D−Hc) greater than the conveyance amount (D−Ha) after the partial printing SP4, it is possible to increase the printing speed. Also, like the first illustrative embodiment, when the non-character object region PA is located at the upstream end of the partial region RA1, the region including the upper end of the partial region RA1 is set as the overlap region. Therefore, it is possible to suppress the banding from being noticeable in the print image PI$b$.

Also, according to the second illustrative embodiment, when the non-character object region PA is not located at the upstream end of the notice partial region (for example, the partial region RA3 in FIG. 11) (NO in S310 of FIG. 10) and the character region including the character TX3$b$ having the density lower than the reference value is located (YES in S340B of FIG. 10), the conveyance amount of the sheet conveyance T, which is to be executed between the notice-part printing (for example, the partial printing SP3) and the subsequent partial printing (for example, the partial printing SP4), is set to the third conveyance amount (for example, D−Hb) greater than the first conveyance amount and less than the second conveyance amount. The region (for example, the region in which the 2-pass partial image SA3 is printed) including the upstream end of the notice partial region is set as the overlap region (S350 in FIG. 10). Therefore, in the example of FIG. 11, the printing mechanism 100 conveys the sheet S by the conveyance amount (D−Hb) after the partial printing SP3, and executes the partial printing SP4 after the conveyance of the sheet S by the conveyance amount (D−Hb), under control of the CPU 210. In this case, the overlap length (i.e., length of the 2-pass partial image SA3) Hb of the overlap region is shorter than the overlap length Ha of the overlap region in which the 2-pass partial image SA1 is printed and longer than the overlap length Hc of the overlap region in which the 2-pass partial image SA3 is printed. The banding is more easily-noticeable at the character TX3*b* having the density lower than the reference value, as compared to the character TX4*b* having the density equal to or higher than the reference value. The reason is that the lower the density of the character is, the black stripe is more easily-noticeable. According to the second illustrative embodiment, as compared to the case where the overlap region having the overlap length Ha is set, it is possible to suppress the character TX3*b* from being thickened. Also, as compared to the case where the overlap region having the overlap length Hc is set, it is possible to suppress the banding from being caused at the character TX3*b*. Therefore, while it is possible to suppress the banding from being generated at the character TX3*b* at which the banding is easily-noticeable, it is possible to suppress the thickness of the character TX3*b*.

Also, according to the second illustrative embodiment, when the non-character object region PA is not located at the upstream end of the notice partial region (for example, the partial region RA5 in FIG. 11) (NO in S310 of FIG. 10) and the character region is not located (NO in S330 of FIG. 10), the conveyance amount of the sheet conveyance T, which is to be executed between the notice-part printing (for example, the partial printing SP5) and the subsequent partial printing (for example, the partial printing SP6), is set to a conveyance amount (an amount greater than the conveyance amount D, in the second illustrative embodiment) greater than any of the first conveyance amount, the second conveyance amount and the third conveyance amount. The overlap region is not set (S360 in FIG. 10). For example, in the example of FIG. 11, a 2-pass partial image is not printed between the 1-pass partial image NA5 and the 1-pass partial image NA6. As a result, it is possible to increase the printing speed.

As can be seen from the above descriptions, the conveying direction AR of the second illustrative embodiment is an example of the moving direction, the conveyance amount (D−Ha) is an example of the first movement amount, the conveyance amount (D−Hc) is an example of the second movement amount, and the conveyance amount (D−Hb) is an example of the third movement amount.

Figure 12:
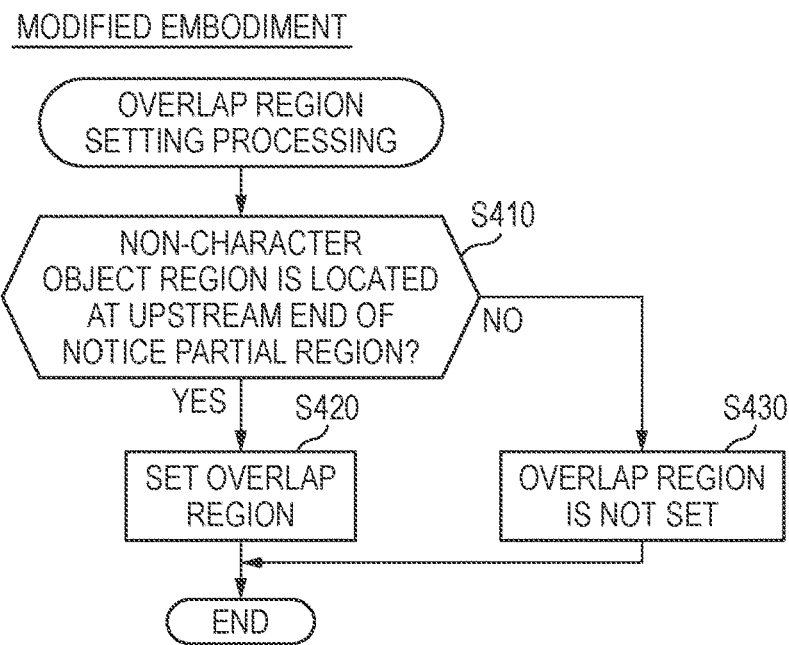
FIG. 12 is a flowchart of overlap region setting processing of a modified embodiment.

C. Modified Embodiments (1) The overlap region setting processing (FIG. 9) of each illustrative embodiment is exemplary and can be appropriately changed. For example, simpler overlap region setting processing can be executed. FIG. 12 is a flowchart of overlap region setting processing in accordance with a modified embodiment. Like S310 of FIGS. 9 and 10, in S410, the CPU 210 determines whether the non-character object region PA is located at the upstream end of the notice partial region. When the non-character object region PA is located at the upstream end of the notice partial region (S410: YES), the CPU 210 sets an overlap region, as an overlap region in which a 2-pass partial image is to be formed by both the notice partial printing and the subsequent partial printing of the notice partial printing, in S420. For example, like S320 of FIGS. 9 and 10, the overlap region having the overlap length Ha is set. When the non-character object region PA is not located at the upstream end of the notice partial region (S410: NO), the CPU 210 does not set an overlap region in S430, like S360 of FIGS. 9 and 10.

In this modified embodiment, when it is assumed that the print image PI of FIG. 5 is printed, the 2-pass partial images SA1 and SA2 are respectively printed between the 1-pass partial image NA1 and the 1-pass partial image NA2 and between the 1-pass partial image NA2 and the 1-pass partial image NA3. No 2-pass partial image is printed between the 1-pass partial image NA3 and the 1-pass partial image NA4, between the 1-pass partial image NA4 and the 1-pass partial image NA5 and between the 1-pass partial image NA5 and the 1-pass partial image NA6. Also in this example, since an appropriate overlap region is set, it is possible to suppress the banding from being noticeable and to suppress the character from being thickened in the print image PI. Also, it is possible to increase the printing speed.

(2) In the first illustrative embodiment, when the non-character object region PA is located at the upstream end of the notice partial region, the overlap region having the overlap length Ha is set, irrespective of whether the character region TA is located at the upstream end of the notice partial region (YES in S310 of FIG. 9, S320). When the non-character object region PA is not located at the upstream end of the notice partial region and the character region including a character having a size smaller than the reference value is located, the overlap region is not set. The condition with which the overlap region having the overlap length Ha is set and the condition with which the overlap region is not set are not limited to the above. An example of the other conditions is described with reference to FIG. 13.

Figure 13:
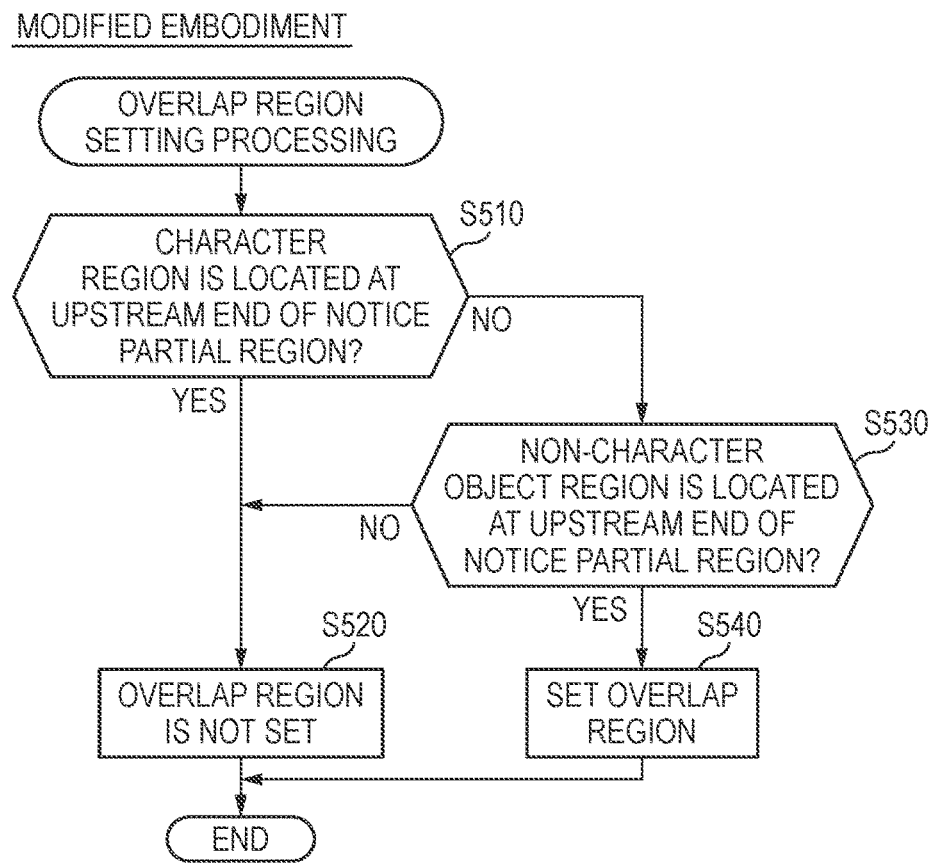
FIG. 13 is a flowchart of overlap region setting processing of a modified embodiment.

FIG. 13 is a flowchart of overlap region setting processing of a modified embodiment. In S510, the CPU 210 determines whether the character region TA is located at the upstream end of the notice partial region. When the character region TA is located at the upstream end of the notice partial region (S510: YES), the CPU 210 does not set an overlap region, in S520.

When the character region TA is not located at the upstream end of the notice partial region (S510: NO), the CPU 210 determines whether the non-character object region PA is located at the upstream end of the notice partial region, in S530. When the non-character object region PA is located at the upstream end of the notice partial region (S530: YES), the CPU 210 sets an overlap region, as the overlap region in which a 2-pass partial image is to be printed by both the notice partial printing and the subsequent partial printing, in S540. When the non-character object region PA is not located at the upstream end of the notice partial region (S530: NO), the CPU 210 does not set an overlap region, in S520.

As can be seen from the above descriptions, in this modified embodiment, when the character region TA is located at the upstream end of the notice partial region, the overlap region is not set, irrespective of whether the non-character object region PA is located at the upstream end of the notice partial region. When the character region TA is not located at the upstream end of the notice partial region and the non-character object region PA is located at the upstream end of the notice partial region, the overlap region is set.

(3) In the second illustrative embodiment, when the non-character object region PA is located at the upstream end of the notice partial region, the overlap region having the overlap length Ha is set (YES in S310 of FIG. 10, S320), irrespective of whether the character region TA is located at the upstream end of the notice partial region. When the non-character object region PA is not located at the upstream end of the notice partial region and the character region including a character of which a density is equal to or higher than the reference value is located at the upstream end of the notice partial region, the overlap region having the overlap length Hc is set. The condition with which the overlap region having the overlap length Ha is set and the condition with which the overlap region having the overlap length Hc is set are not limited to the above.

For example, in the overlap region setting processing of FIG. 13, the overlap region having the overlap length Hc may be set in S540. That is, when the character region TA is located at the upstream end of the notice partial region, the overlap region having the overlap length Hc may be set, irrespective of whether the non-character object region PA is located at the upstream end of the notice partial region. When the character region TA is not located at the upstream end of the notice partial region and the non-character object region PA is located at the upstream end of the notice partial region, the overlap region having the overlap length Ha may be set.

(4) In the first illustrative embodiment, when the character region is located at the upstream end of the notice partial region (S330: YES, in FIG. 9), the overlap region may be set or not, depending on whether the size of the character in the character region is equal to or larger than the reference value. The condition of switching whether or not to set the overlap region is not limited thereto. For example, also in the first illustrative embodiment, the overlap region may be set or not, depending on whether the density of the character in the character region is less than the reference value, like the second illustrative embodiment.

Also, the switching condition of the first illustrative embodiment may be other conditions. For example, when the size of the character is equal to or greater than the reference value or the density of the character is less than the reference value, the overlap region may be set, and when the size of the character is smaller than the reference value and the density of the character is equal to or greater than the reference value, the overlap region may not be set. Alternatively, when the color of the character is a specific color (for example, yellow, blue) in which the banding is easily-noticeable, the overlap region may be set, and when the color of the character is different from the specific color, the overlap region may not be set. The specific color may be determined in advance by a test, for example.

In the second illustrative embodiment, the overlap length of the overlap region is set to Hb or Hc, depending on whether the density of the character in the character region is less than the reference value. Instead of this configuration, also in the second illustrative embodiment, like the first illustrative embodiment, the overlap length of the overlap region may be set to Hb or Hc, depending on whether the size of the character in the character region is equal to or greater than the reference value. Also, the switching condition of the second illustrative embodiment may be other conditions, like the switching condition of the first illustrative embodiment.

(5) The region specifying processing (FIG. 6) of the illustrative embodiments is exemplary and the present disclosure is not limited thereto. For example, as the region specifying processing, the well-known processing capable of specifying the non-character region and the character region in the RGB image RI and the print image PI may be adopted. For example, a region, which has a feature as a predetermined character, of the region of the determination target may be specified as the character region, and a region having a feature as a photograph may be specified as the non-character object region. The feature as the character may include a feature that the number of colors is smaller than a threshold value and a feature that a ratio of object pixels having a color different from a ground color is smaller than a threshold value TH2, for example. The feature as the photograph may include a feature that the number of colors is larger than a threshold value and a feature that a ratio of object pixels having a color different from the ground color is greater than a threshold value, for example. Here, the well-known method of the region specifying processing is disclosed in JP-A-2013-030090, JP-A-H05-225378, JP-A-2002-288589, and the like, for example.

Also, in the region specifying processing, for example, when the target image data before the rasterization processing of S20 is described by a predetermined page description language (for example, PostScript), the target image data includes a drawing command including character information indicative of an arrangement position (for example, coordinates) and a size of a character in the RGB image RI and a drawing command including non-character information indicative of an arrangement position and a size of a non-character object. In this case, the CPU 210 may specify the character region and the non-character region in the RGB image RI and the print image PI by using the character information and non-character information included in the target image data.

(6) In the illustrative embodiments, when setting the overlap region having the overlap length Ha (for example, S320 in FIGS. 9 and 10), the conveyance amount TV of the sheet conveyance T after the notice partial printing is determined to be the value obtained by subtracting the overlap length Ha from the nozzle length D (TV=D−Ha). Instead of this configuration, the conveyance amount TV may be determined to be a value obtained by subtracting a sum of a predetermined adjusting length a and the overlap length Ha from the nozzle length D (TV=D−(Ha+α)). For example, the predetermined adjusting length a is a small length such as several μms. Thereby, for example, an object value of the conveyance amount TV is set as a value slightly smaller than an ideal conveyance amount. As a result, even when a conveyance error occurs during the actual conveyance, it is possible to suppress an actual conveyance amount from being greater than the ideal conveyance amount. If the actual conveyance amount becomes greater than the ideal conveyance amount, a black stripe is likely to be formed between a region to be printed by the notice partial printing and a region to be printed by the subsequent partial printing and a white stripe is difficult to be formed. If the actual conveyance amount becomes smaller than the ideal conveyance amount, a white strip is likely to be formed between the region to be printed by the notice partial printing and the region to be printed by the subsequent partial printing and a black stripe is difficult to be formed. In general, the white stripe is less acceptable than the black stripe. Therefore, it is not preferable that, when a conveyance error occurs, the actual conveyance amount becomes greater than the ideal conveyance amount. Like this, generally, the conveyance amount TV is preferably determined to be a value obtained by subtracting a length based on the overlap length Ha (for example, the overlap length Ha itself or (Ha+α)) from the nozzle length D. This applies to the case where the overlap region having the overlap length Hb; Hc is set (for example, S350 and S355B in FIGS. 9 and 10), too.

(7) As the printing medium, a film for OHP, a CD-ROM or a DVD-ROM may be adopted, instead of the sheet S, for example.

(8) In the illustrative embodiments, the printing mechanism 100 is a serial printer including the main scanning unit 130 and configured to drive the printing head 240 for partial printing during the main scanning. Instead of this configuration, the printing mechanism 100 may be a so-called line printer for which the main scanning unit 130 is not provided and a printing head having a plurality of nozzles aligned side by side over the substantially same length as a width of the sheet S in a direction perpendicular to the conveying direction and provided in multiple rows in the conveying direction is instead provided. In the line printer, the printing is executed without executing the main scanning. Also in this case, it is preferable that the partial printing for forming dots by the printing head and the conveyance of the sheet S by the conveyance unit are alternately executed multiple times for printing.

(9) In the printing mechanism 100 of the first illustrative embodiment, the conveyance unit 140 is configured to convey the sheet S, thereby moving the sheet S relative to the printing head 110 in the conveying direction AR. Instead of this configuration, the printing head 110 may be moved relative to the fixed sheet S in an opposite direction to the conveying direction AR, so that the sheet S may be moved relative to the printing head 110 in the conveying direction AR.

(10) In the respective illustrative embodiments, a device functioning as the control device for causing the printing mechanism 100 as the printing execution unit to execute the printing processing of FIG. 4 is the CPU 210. Instead of this configuration, the device functioning as the control device may be other device, for example, a user's terminal device (not shown). In this case, for example, the terminal device is configured to operate as a printer driver by executing a driver program, and to control a printer as the printing execution unit to execute the printing processing of FIG. 4, as a part of functions of the printer driver. In this case, the terminal device is configured to supply a printing job, which is generated using print image data, to the printer and to cause the printer to execute the printing processing.

As can be seen from the above descriptions, in the illustrative embodiments, the printing mechanism 100 is an example of the printing execution unit, and when the terminal device executes the printing processing, the whole printer configured to execute the printing is an example of the printing execution unit.

Also, the control device for causing the printer to execute the printing processing of FIG. 4 may be a server configured to acquire the image data from the printer or the terminal device and to generate the printing job by using the acquired image data, for example. The server may be a plurality of computing devices capable of performing communication with each other via a network. In this case, the plurality of entire computing devices capable of performing communication with each other via the network is an example of the control device.

(11) In the respective illustrative embodiments, a part of the configurations implemented by the hardware may be replaced with software, and a part or all of the configurations implemented by the software may be replaced with hardware. For example, a part of the processing that is to be executed by the CPU 210 of the printer 200 of FIG. 1 may be implemented by a dedicated hardware circuit.

Although the present disclosure has been described with reference to the illustrative embodiments and the modified embodiments thereof, the embodiments are provided so as to easily understand the present disclosure, not to limit the present disclosure. The present disclosure can be changed and improved without departing from the gist and the claims, and the equivalents thereof are included in the present disclosure.

What is claimed is:

1. A control device for a printing execution unit including: a printing head including a plurality of nozzles configured to discharge ink; a head drive unit configured to cause the printing head to discharge the ink and to form dots on a printing medium; and a movement unit configured to move the printing medium relative to the printing head in a moving direction, the control device comprising:
a controller configured to perform:
acquiring target image data;
specifying a character region indicative of a character in a print image based on the target image data, and a non-character object region indicative of an object different from the character in the print image; and
causing the printing execution unit to print the print image by using the target image data, the print image being printed by alternately executing, for a plurality of times, (i) a partial printing in which dots are formed by the printing head and (ii) moving of the printing medium by the movement unit, and the plurality of times of the partial printings including a first partial printing and a second partial printing,
wherein, in a case where a first condition including a condition that the non-character object region is located at an upstream end, in the moving direction, of a partial region which is configured to be printed by the first partial printing is met, the printing execution unit is caused to print the print image by:
executing the first partial printing;
moving the printing medium by a first movement amount after the first partial printing has been executed; and
executing the second partial printing after the printing medium has been moved by the first movement amount, wherein dots are formed in a first overlap region by both the first partial printing and the second partial printing, the first overlap region including the upstream end of the partial region,
wherein, in a case where a second condition including a condition that the character region is located at the upstream end of the partial region is met, the printing execution unit is caused to print the print image by:
executing the first partial printing;
moving the printing medium by a second movement amount greater than the first movement amount after the first partial printing has been executed; and
executing the second partial printing after the printing medium has been moved by the second movement amount, wherein the dots are formed in the partial region by the first partial printing and the dots are not formed in the partial region by the second partial printing.

2. The control device according to claim 1,
wherein the character region is a first type character region indicative of a first type character in the print image,
wherein the controller is configured to further perform:
specifying a second type character region indicative of a second type character in the print image,
wherein, in a case where the second type character region is located at the upstream end of the partial region, the printing execution unit is caused to print the print image by:
executing the first partial printing;
moving the printing medium by a third movement amount greater than the first movement amount and less than the second movement amount after the first partial printing has been executed; and executing the second partial printing after the printing medium has been moved by the third movement amount, wherein dots are formed in a third overlap region by both the first partial printing and the second partial printing, the third overlap region including the upstream end of the partial region, and wherein a length of the third overlap region in the moving direction is shorter than a length of the first overlap region in the moving direction.

3. The control device according to claim 2, wherein the first type character is a character having a density equal to or higher than a first reference value, and wherein the second type character is a character having a density lower than the first reference value.

4. The control device according to claim 2, wherein the first type character is a character having a size smaller than a second reference value, and wherein the second type character is a character having a size equal to or larger than the second reference value.

5. The control device according to claim 1, wherein, in a case where the non-character object region is located at the upstream end of the partial region, the first condition is determined to be met irrespective of whether the character region is located at the upstream end of the partial region, and wherein, in a case where the non-character object region is not located at the upstream end of the partial region and the character region is located at the upstream end of the partial region, the second condition is determined to be met.

6. The control device according to claim 1, wherein the controller is configured to further perform:
classifying a plurality of pixels in a target image based on the target image data into a plurality of object pixels and a plurality of background pixels, and wherein, in a case where a ratio of the object pixels occupying a determination target region in the target image is smaller than a threshold value, the determination target region is specified as the character region.

7. The control device according to claim 1, wherein the printing execution unit further includes a main scanning unit configured to execute a main scanning of moving the printing head in a main scanning direction intersecting with the moving direction, and wherein the head drive unit is configured to execute the partial printing by causing the printing head to form the dots during the main scanning.

8. A printing apparatus comprising:
the control device according to claim 1; and
the printing execution unit.

9. A non-transitory computer readable storage medium storing a program for controlling a printing execution unit including: a printing head including a plurality of nozzles configured to discharge ink; a head drive unit configured to cause the printing head to discharge the ink and to form dots on a printing medium; and a movement unit configured to move the printing medium relative to the printing head in a moving direction, the program, when executed by a computer of a control device, causing the control device to perform:

acquiring target image data;

specifying a character region indicative of a character in a print image based on the target image data, and a non-character object region indicative of an object different from the character in the print image; and causing the printing execution unit to print the print image by using the target image data, the print image being printed by alternately executing, for a plurality of times, (i) a partial printing in which dots are formed by the printing head and (ii) moving of the printing medium by the movement unit, and the plurality of times of the partial printings including a first partial printing and a second partial printing, wherein, in a case where a first condition including a condition that the non-character object region is located at an upstream end, in the moving direction, of a partial region which is configured to be printed by the first partial printing is met, the printing execution unit is caused to print the print image by:

executing the first partial printing;

moving the printing medium by a first movement amount after the first partial printing has been executed; and executing the second partial printing after the printing medium has been moved by the first movement amount, wherein dots are formed in a first overlap region by both the first partial printing and the second partial printing, the first overlap region including the upstream end of the partial region, wherein, in a case where a second condition including a condition that the character region is located at the upstream end of the partial region is met, the printing execution unit is caused to print the print image by:

executing the first partial printing;

moving the printing medium by a second movement amount greater than the first movement amount after the first partial printing has been executed; and executing the second partial printing after the printing medium has been moved by the second movement amount, wherein the dots are formed in the partial region by the first partial printing and the dots are not formed in the partial region by the second partial printing.

* * * * *